United States Patent
Kuester et al.

(10) Patent No.: US 10,710,507 B2
(45) Date of Patent: Jul. 14, 2020

(54) CAM-DRIVEN TOGGLE SWITCH FOR MIRROR ASSEMBLY

(71) Applicant: Gentex Corporation, Zeeland, MI (US)

(72) Inventors: Ulrich A. Kuester, Spring Lake, MI (US); Luke A. Bomers, Grandville, MI (US)

(73) Assignee: GENTEX CORPORATION, Zeeland, MI (US)

( * ) Notice: Subject to any disclaimer, the term of this patent is extended or adjusted under 35 U.S.C. 154(b) by 209 days.

(21) Appl. No.: 15/798,460

(22) Filed: Oct. 31, 2017

(65) Prior Publication Data
US 2018/0118115 A1    May 3, 2018

Related U.S. Application Data

(60) Provisional application No. 62/415,319, filed on Oct. 31, 2016, provisional application No. 62/452,449, filed on Jan. 31, 2017.

(51) Int. Cl.
*B60R 1/08*   (2006.01)
*B60R 1/04*   (2006.01)

(52) U.S. Cl.
CPC ............... *B60R 1/086* (2013.01); *B60R 1/04* (2013.01)

(58) Field of Classification Search
CPC ... B60R 1/04; B60R 2011/0033; B60R 1/086; B60R 1/025; B60R 1/02
See application file for complete search history.

(56) References Cited

U.S. PATENT DOCUMENTS

| | | | |
|---|---|---|---|
| 3,421,728 A | 1/1969 | Gordon | |
| 3,467,465 A | 9/1969 | Van Noord | |
| 4,895,337 A | 1/1990 | Oskam et al. | |
| 5,582,383 A | 12/1996 | Mertens et al. | |
| 5,956,181 A | 9/1999 | Lin | |
| 5,969,870 A | 10/1999 | Jain et al. | |
| 6,318,870 B1 | 11/2001 | Spooner et al. | |
| 6,321,159 B1 | 11/2001 | Nohtomi et al. | |
| 6,329,925 B1 * | 12/2001 | Skiver | B60R 1/12 340/815.4 |

(Continued)

FOREIGN PATENT DOCUMENTS

| | | |
|---|---|---|
| EP | 0202757 A2 | 4/1985 |
| EP | 1103421 A2 | 5/2001 |
| EP | 1275559 B1 | 1/2003 |

*Primary Examiner* — Jade R Chwasz
(74) *Attorney, Agent, or Firm* — Price Heneveld LLP; Bradley D. Johnson

(57) ABSTRACT

A rearview mirror for a vehicle includes a substrate having a reflective surface thereon and an actuation mechanism coupled with the substrate. The actuation mechanism includes a mounting plate rotatably coupled with the substrate at a first end thereof and having a first pin extending outwardly from a side of the mounting plate in a direction parallel with the first end and spaced apart therefrom. The actuation mechanism also includes a toggle unit positionally fixed with respect to the substrate and rotatable about an axis between first and second positions, the toggle unit including a first cam body defining a first track having a first end at a first distance from the axis and a second end at a second distance from the axis that is greater than the first distance, the first pin of the mounting plate being slidably engaged with the first track.

20 Claims, 18 Drawing Sheets

(56) References Cited

U.S. PATENT DOCUMENTS

| | | |
|---|---|---|
| 6,349,450 B1 | 2/2002 | Koops et al. |
| 6,520,667 B1 | 2/2003 | Mousseau |
| 6,549,691 B1 | 4/2003 | Street et al. |
| 6,567,574 B1 | 5/2003 | Ma et al. |
| 6,648,477 B2 | 11/2003 | Hutzel et al. |
| 6,711,314 B1 | 3/2004 | Mori et al. |
| 6,871,968 B2 | 3/2005 | Wachi |
| 6,922,500 B2 | 7/2005 | Huang et al. |
| 6,934,438 B2 | 8/2005 | Hoke |
| 6,947,629 B2 | 9/2005 | Chu et al. |
| 7,255,451 B2 | 8/2007 | McCabe et al. |
| 7,329,013 B2 | 2/2008 | Blank et al. |
| 7,510,287 B2 | 3/2009 | Hook |
| 7,722,199 B2 | 5/2010 | DeWard et al. |
| 7,888,629 B2 | 2/2011 | Heslin et al. |
| 7,916,009 B2 | 3/2011 | Schofield et al. |
| 8,351,454 B2 | 1/2013 | Jain et al. |
| 8,817,359 B2 | 8/2014 | Chau |
| 9,041,806 B2 | 5/2015 | Baur et al. |
| 9,338,528 B2 | 5/2016 | Borkenhagen et al. |
| 9,475,431 B2 | 10/2016 | Brummel et al. |
| 9,529,157 B2 | 12/2016 | Zhang et al. |
| 2002/0047378 A1 | 4/2002 | Bingle et al. |
| 2002/0159171 A1 | 10/2002 | Schnell et al. |
| 2003/0011908 A1* | 1/2003 | Marusawa ............ B29C 45/006 359/872 |
| 2003/0137757 A1 | 7/2003 | Wachi |
| 2004/0148102 A1 | 7/2004 | McCarthy et al. |
| 2004/0263988 A1 | 12/2004 | Lin |
| 2005/0068647 A1 | 3/2005 | Brandt |
| 2005/0213978 A1 | 9/2005 | Yamashita et al. |
| 2005/0248847 A1 | 11/2005 | Weimer et al. |
| 2006/0050018 A1 | 3/2006 | Hutzel et al. |
| 2007/0279756 A1 | 12/2007 | Rosario et al. |
| 2008/0049344 A1 | 2/2008 | DeWard et al. |
| 2008/0055757 A1 | 3/2008 | Uken et al. |
| 2008/0077882 A1 | 3/2008 | Kramer et al. |
| 2008/0225538 A1 | 9/2008 | Lynam et al. |
| 2009/0040306 A1 | 2/2009 | Foote et al. |
| 2010/0046104 A1 | 2/2010 | Rimac |
| 2011/0176323 A1 | 7/2011 | Skiver et al. |
| 2011/0188122 A1 | 8/2011 | Habibi et al. |
| 2013/0107347 A1 | 5/2013 | Chau |
| 2013/0279014 A1 | 10/2013 | Fish, Jr. et al. |
| 2014/0347488 A1 | 11/2014 | Tazaki et al. |
| 2015/0329053 A1 | 11/2015 | Lee et al. |
| 2016/0250970 A1 | 9/2016 | Kuester et al. |

\* cited by examiner

CAM-DRIVEN TOGGLE SWITCH FOR MIRROR ASSEMBLY

CROSS-REFERENCE TO RELATED APPLICATIONS

This application claims priority under 35 U.S.C. § 119(e) to U.S. Provisional Application No. 62/415,319, filed on Oct. 31, 2016, entitled "BI-MODAL SWITCH" and U.S. Provisional Application No. 62/452,449, filed on Jan. 31, 2017, entitled "CAM-DRIVEN TOGGLE SWITCH FOR MIRROR ASSEMBLY" the disclosures of which are hereby incorporated herein by reference in their entirety.

TECHNOLOGICAL FIELD

The present disclosure relates generally to a rearview mirror for a motor vehicle and, more particularly, relates to a mechanism for movement of a reflective surface of the mirror substrate through a predetermined angle.

BACKGROUND

Various types of rearview mirrors can be used in connection with vehicle interiors. In general, rearview mirrors are mounted adjacent the windshield either by attachment with the windshield or to an internal component adjacent the headliner. Such attachment is, for example, achieved by a mounting that couples with an actuation mechanism internal to the mirror housing. A substrate is affixed with the mirror housing and is generally configured to present an image of the view to the rear of the vehicle and, accordingly, may be adjustable by movement of the housing about the mounting structure.

In the case of a standard rearview mirror, the substrate is often a prism-type mirror that provides for a viewing angle at which the substrate reflects the rearward view of the mirror with a reduced luminosity to provide a dimming effect useful when driving at night, for example. In such an embodiment, the dimmed viewing angle for the substrate may be at a predetermined angle upward (i.e. toward the headliner) relative to the "normal" viewing angle. To achieve such positioning, rearview mirrors include various types of actuation mechanisms to provide for user control in repositioning of the substrate. Such movement can be achieved by manipulation of a lever, which can cause the actuation mechanism to move between stable positions, thereby causing movement of the substrate through a predetermined angle relative to the mounting structure that appropriately positions the substrate in a corresponding viewing position. Further, the actuation mechanism can couple with the mounting to allow general adjustment of the housing and substrate with respect to the driver for viewing of the image viewable on the substrate. In this manner, the actuation mechanism can allow the substrate to toggle between the stable viewing positions without changing the positions themselves such that the substrate provides generally the same view in the night mode as has been selected for the standard mode.

Some existing actuation mechanisms achieve movement between the above-referenced stable positions by way of a resiliently deformable spring plate. In general, such spring plates include a bent section to provide an area of flexation that accommodates movement of components within the actuation mechanism. The spring force achieved by such flexation can urge the actuation mechanism to one of the stable positions. These types of structures, while providing biasing forces toward both stable positions, may provide force in the directions toward and away from the stable positions in varying amounts. In particular, the shape of the bent portion or portions may serve to secure the mechanism in one of the stable positions, including making it less susceptible to unintended movement out of such position by a force applied on the mirror housing, for example. However, in the opposite position, the mechanism may be susceptible, depending on the particular spring force and other internal forces, to inadvertent movement out of the stable position, which may be caused by a user adjusting the position of the mirror by grasping and moving the housing. In the case of a standard prism mirror, such inadvertent actuation may be inconvenient. Accordingly, further advances may be desired.

SUMMARY

According to an aspect of the disclosure, a rearview mirror for a vehicle includes a substrate having a reflective surface thereon and an actuation mechanism coupled with the substrate. The actuation mechanism includes a mounting plate rotatably coupled with the substrate at a first end thereof and having a first pin extending outwardly from a side of the mounting plate in a direction parallel with the first end and spaced apart therefrom. The actuation mechanism also includes a toggle unit positionally fixed with respect to the substrate and rotatable about an axis between first and second positions, the toggle unit including a first cam body defining a first track having a first end at a first distance from the axis and a second end at a second distance from the axis that is greater than the first distance, the first pin of the mounting plate being slidably engaged with the first track.

According to another aspect of the disclosure, a rearview mirror for a vehicle includes a substrate having a reflective surface thereon and an actuation mechanism coupled with the substrate. The actuation mechanism includes a mounting plate rotatably coupled with the substrate at a first end thereof and having an aperture therein extending in a direction parallel with the first end and spaced apart therefrom and a toggle unit positionally fixed with respect to the substrate and rotatable about an axis between first and second positions. The toggle unit includes a first cam body defining a first track having a first end at a first distance from the axis and a second end at a second distance from the axis that is greater than the first distance. A first pin in the form of an elongate member is slidably engaged with the aperture in the mounting plate and extends outwardly from a side of the mounting plate to slidably engage with the first track.

According to another aspect of the disclosure, a rearview mirror for a vehicle includes a substrate having a reflective surface thereon and an actuation mechanism coupled with the substrate. The actuation mechanism includes a mounting plate rotatably coupled with the substrate at a first end thereof and having a first pin end positioned outwardly of a first side of the mounting plate and a second pin end positioned outwardly of a second side of the mounting plate, each in a direction parallel with the first end and spaced apart therefrom. The actuation mechanism also includes a toggle unit positionally fixed with respect to the substrate and rotatable about an axis between first and second positions. The toggle unit has a first cam body and a second cam body respectively adjacent the first and second sides of the mounting plate and respectively defining a first track and a second track, each having a first end at a first distance from the axis and a second end at a second distance from the axis that is greater than the first distance. The first pin end of the mounting plate is slidably engaged with the first track and the second pin end of the mounting plate is slidably engaged with the second track.

These and other features, advantages, and objects of the present device will be further understood and appreciated by those skilled in the art upon studying the following specification, claims, and appended drawings.

DETAILED DESCRIPTION OF EMBODIMENTS

Figure 1:
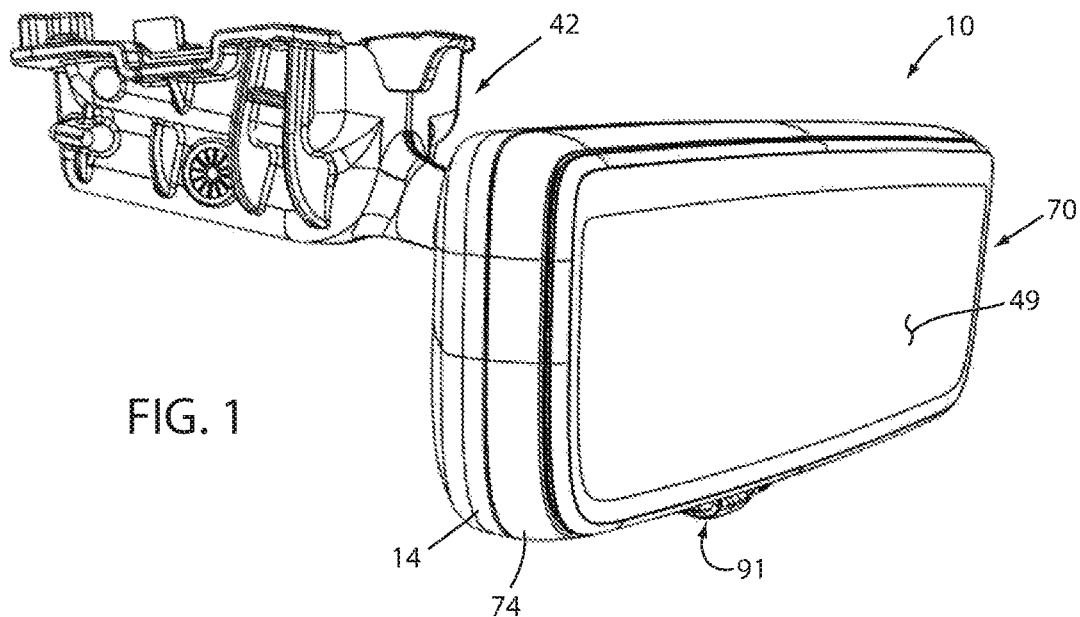
FIG. 1 is a front perspective view of a rearview mirror according to an aspect of the present disclosure.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As shown in FIGS. 1-11, reference numeral 10 generally designates a rearview mirror useable within a vehicle 12. Rearview mirror 10 includes a substrate 46 having a reflective surface 49 thereon and an actuation mechanism 18 coupled with the substrate 46. Actuation mechanism 18 has a mounting plate 20 that is rotatably coupled with the substrate 46 at a first end 22 of the mounting plate 20 and, further, has a first pin 24 extending outwardly from a side 26 of the mounting plate 20 in a direction parallel with the first end 22 and spaced apart therefrom. A toggle unit 28 is positionally fixed with respect to the substrate 46 and is rotatable about an axis 30 between first (FIG. 3) and second (FIG. 4) positions. The toggle unit 28 includes a first cam body 32 defining a first track 34 having a first end 50 at a first distance 52 from the axis 30 and a second end 53 at a second distance 54 from the axis 30 that is greater than the first distance 52. The first pin 24 of the mounting plate 20 is slidably received within the first track 34.

Figure 2:
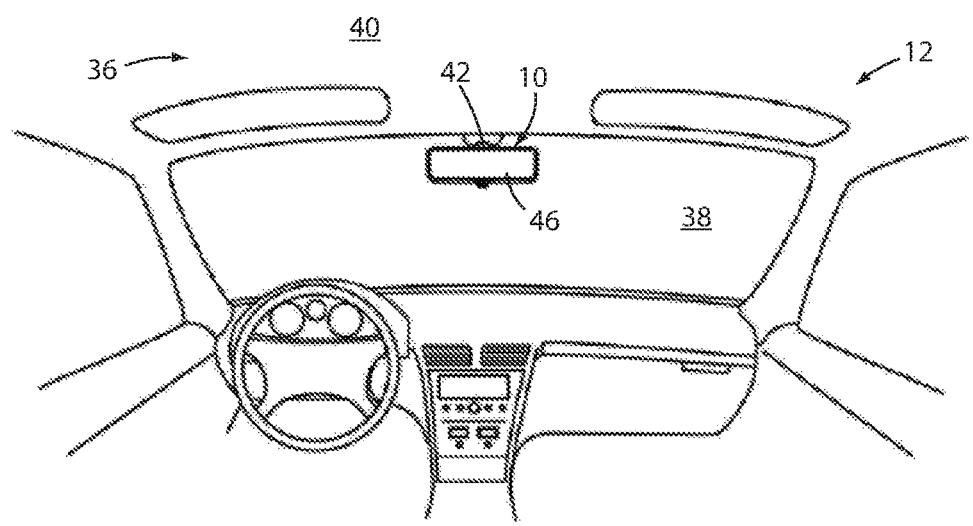
FIG. 2 is a perspective view of an interior of a vehicle including the rearview mirror of FIG. 1 therein.
Figure 3:
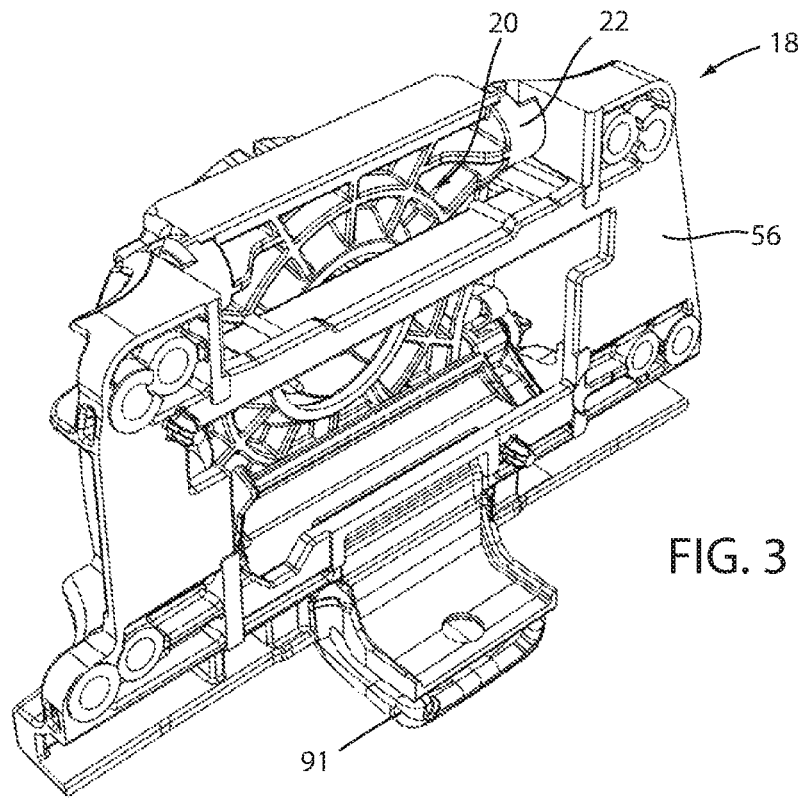
FIG. 3 is a front perspective view of an actuation mechanism in a first condition.
Figure 4:
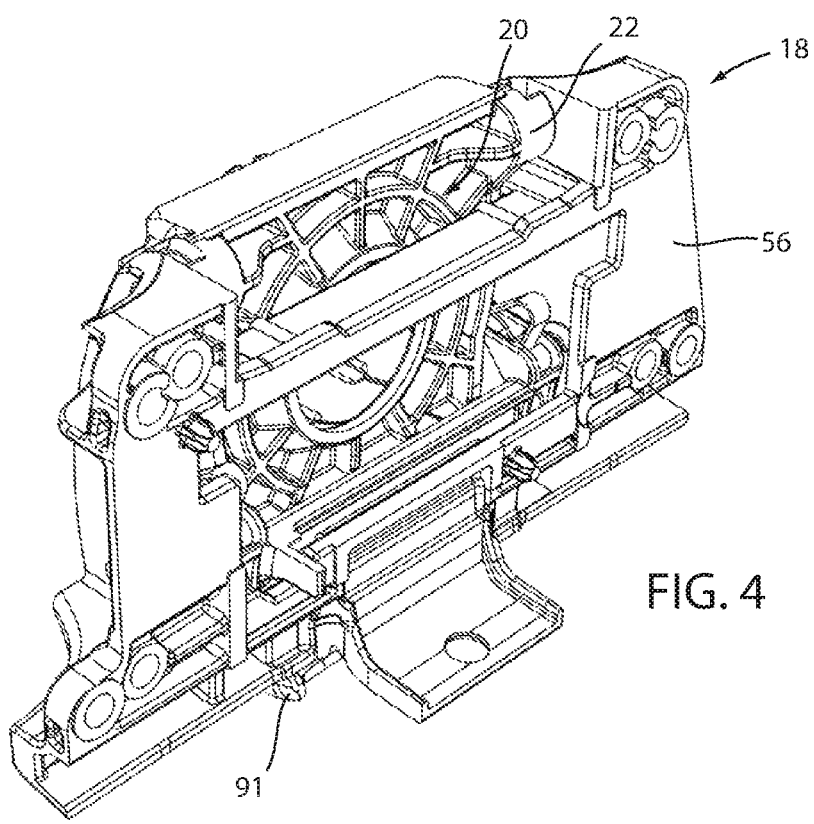
FIG. 4 is a front perspective view of the actuation mechanism of FIG. 3 in a second condition.
Figure 5:
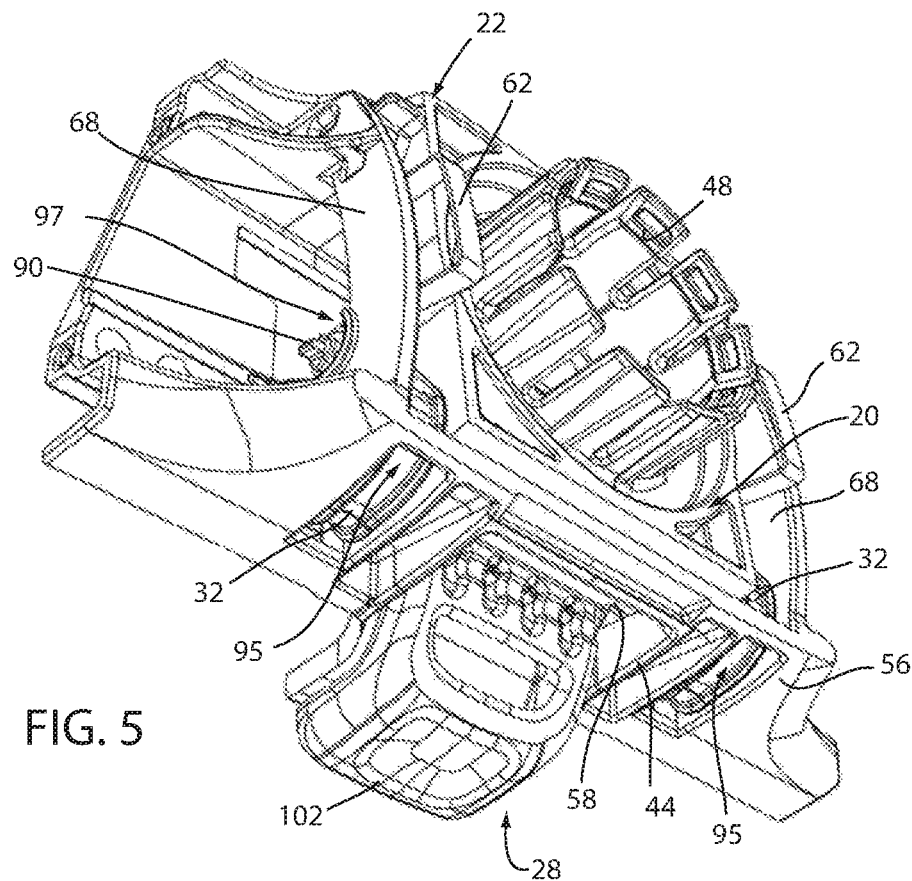
FIG. 5 is a rear perspective view of the actuation mechanism of FIG. 3.
Figure 6:
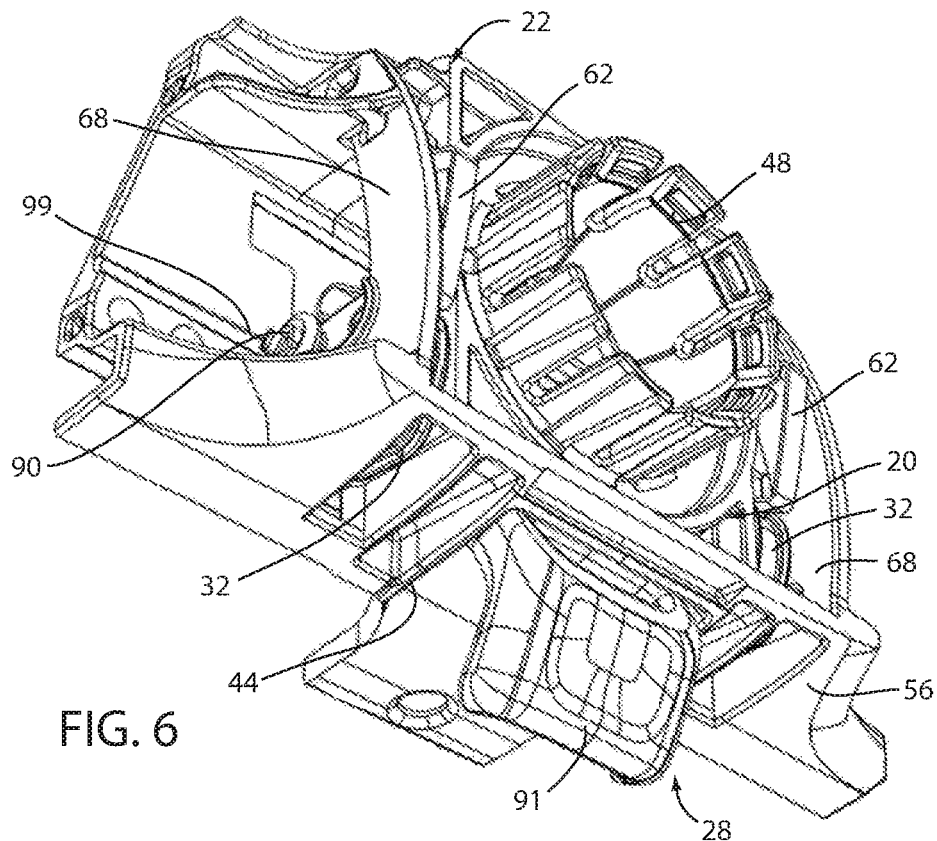
FIG. 6 is a rear perspective view of the actuation mechanism of FIG. 4.
Figure 7:
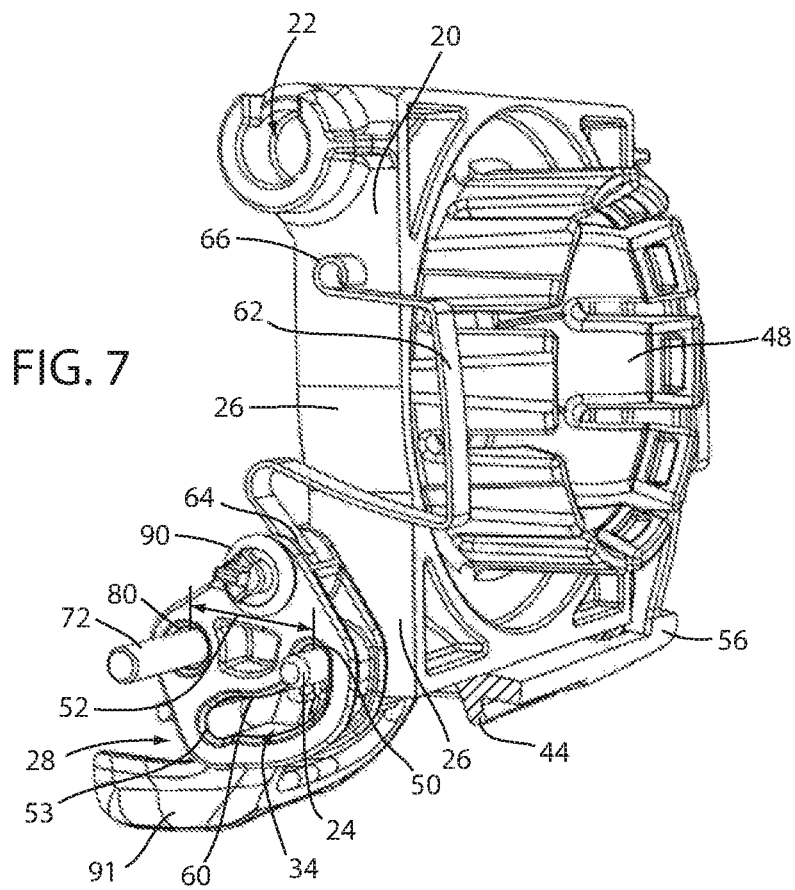
FIG. 7 is a rear perspective view of the actuation mechanism of FIG. 3 in the first condition with portions thereof removed to show additional internal features.
Figure 8:
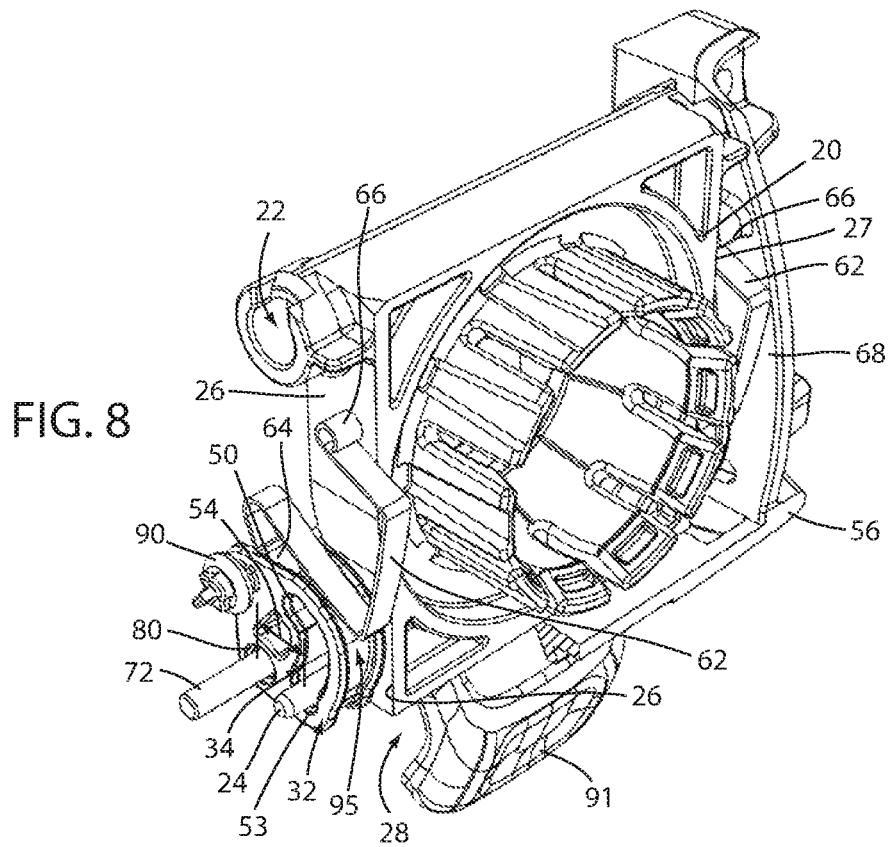
FIG. 8 is a rear perspective view of the actuation mechanism with portions removed of FIG. 7 in the second condition.

As shown in FIG. 2, rearview mirror 10 can be used in connection with a vehicle interior 36. In particular, rearview mirror 10 can be mounted adjacent a windshield 38 of vehicle 12 either by attachment with the windshield 38 itself or to an internal component adjacent headliner 40 (which may include a portion of the vehicle frame, a vehicle panel, or other support structure, for example). Such attachment is achieved by a mounting arm 42 that is coupled with vehicle 12, as described, and couples with actuation mechanism 18, as explained further below, by extending through an opening 44 (FIG. 5) in housing 14 (FIG. 1). Opposite opening 44, a substrate 46 is positioned over an open side 76 (FIG. 10) of housing 14. Substrate 46 is generally configured to present an image (reflected or video, as described below) to a driver of vehicle 12 of the view to the rear of vehicle 12 and, accordingly, may be adjustable by movement of housing 14 with respect to mounting arm 42. In one embodiment, substrate 46 can be in the form of a prism mirror substrate of a generally transparent material having a tapered shape and an internal reflective surface. In this manner, the above-described rotation of toggle unit 28 (FIG. 5) can, as described further below, cause rotation of housing 14 and substrate 46 between a downwardly-angled position, in which the image reflected off of the highly-reflective surface is oriented toward the rear of the vehicle 12 so as to be visible by the driver, and an upwardly-directed position in which the highly-reflective surface reflects an image of the headliner 40, the outer, polished surface reflecting an image toward the rear of the vehicle 12. In general, this arrangement allows for separate day and night modes in which the upwardly-directed position presents a dimmer image to the driver, by way of the polished surface instead of the mirror surface.

In another embodiment, substrate 46 may include a video display along a portion or an entirety thereof such that rearview mirror 10 is what may be referred to as a full-display mirror. Substrate 46, when including such a display, may be referred to herein as "display substrate 46" and may be capable of displaying a mirror-image of the view to the rear of vehicle 12 (that may be captured by an appropriately-positioned video camera or the like) when the display is in an active state. Such an image may generally replicate that which would be available from a typical reflective mirror and can be supplemented with other information presented on display substrate 46. In combination with such display substrate 46, a reflective surface 49 (FIG. 1) may be applied so as to overlie the display as a coating or separate element having properties to both provide a reflected image as well as to permit a video image of display substrate 46 to be visible therethrough.

The presence of reflective surface 49 permits substrate 46 to be used as a standard rearview mirror (i.e. without the need to view the displayed image) when the display is inactive, which may occur when the related vehicle 12 is not running or when power to the display substrate 46 is interrupted, for example. When in the active state, however, the presence of the reflective surface 49 over display substrate 46 can cause the image reflected by reflective surface 49 to compete with an image presented on display substrate 46. To alleviate such image competition, substrate 46 can be positioned such that reflective surface 49 reflects an image of the headliner 40 toward the driver. Because vehicle headliners are of generally consistent, non-reflective material, such an image may compete less with the video image of display substrate 46.

Rearview mirror 10, by way of the actuation mechanism 18 shown in FIGS. 3-12, including toggle unit 28, can allow for a user to control repositioning of substrate 46 between the above-described downwardly- and upwardly-directed positions for the desired use of mirror 10, depending on the type of substrate 46. Such movement can be achieved by manipulation of lever 91 between the first position, shown in FIG. 11, for example, to the second position, shown in FIG. 12, which can cause actuation mechanism 18 to change from a first stable configuration (FIG. 11) to a second stable configuration (FIG. 12), which in turn causes movement of housing 14 and substrate 46 through a predetermined angle relative to mounting arm 42. In an example, such movement can be through an upward (i.e. toward headliner 40) angle 84 (FIG. 12) of between about 4° and 10°, in one embodiment about 7°, and in another embodiment, about 4.5°.

Figure 11:
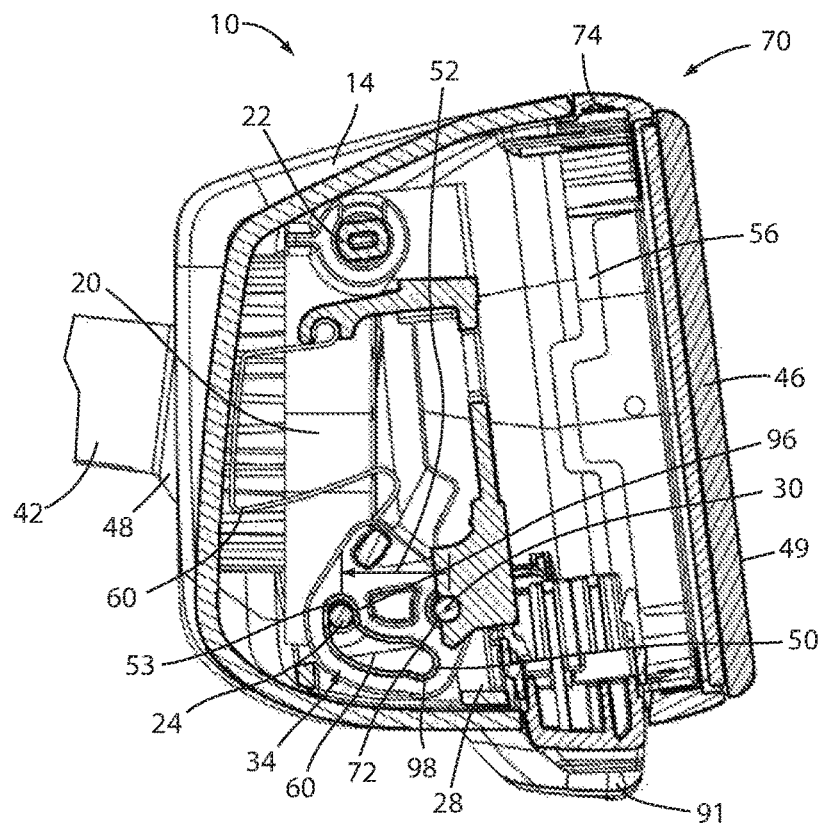
FIG. 11 is a side, partial cross-section view of the rearview mirror of FIG. 1 with the actuation mechanism thereof in the first condition.
Figure 12:
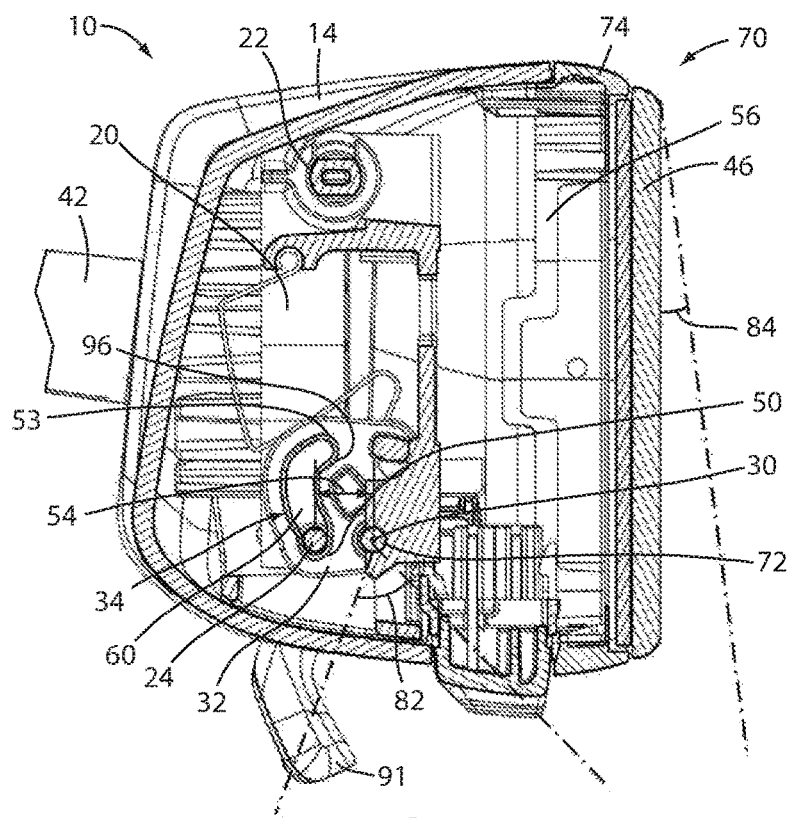
FIG. 12 is a side, partial cross-section view of the rearview mirror of FIG. 1 with the actuation mechanism thereof in the second condition.
Figure 13:
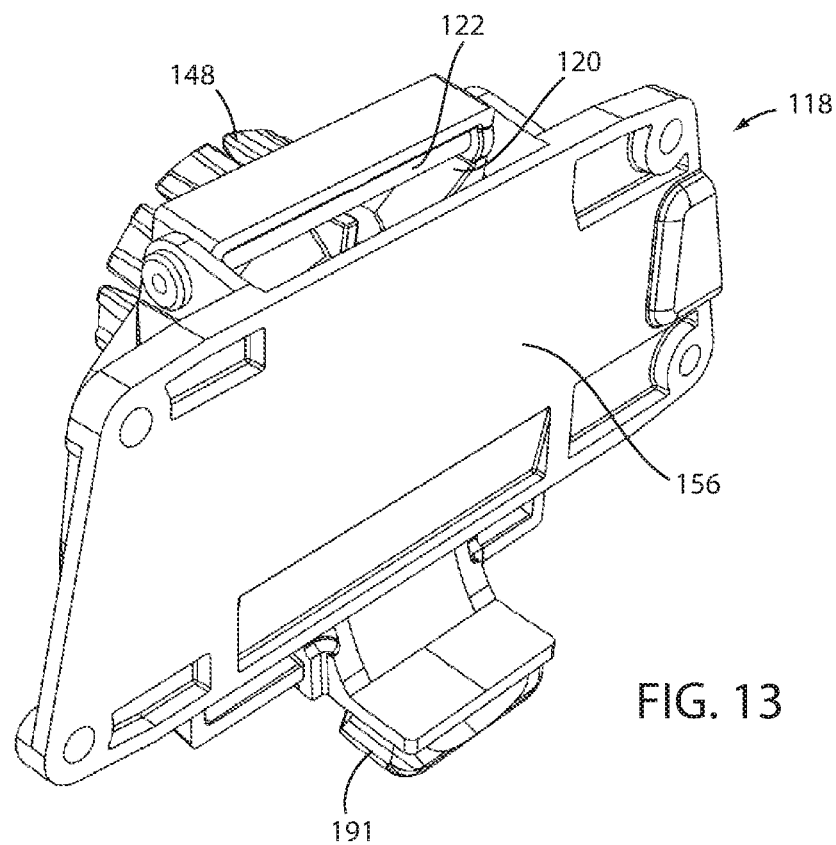
FIG. 13 is a front perspective view of an alternative actuation mechanism in a first condition.
Figure 14:
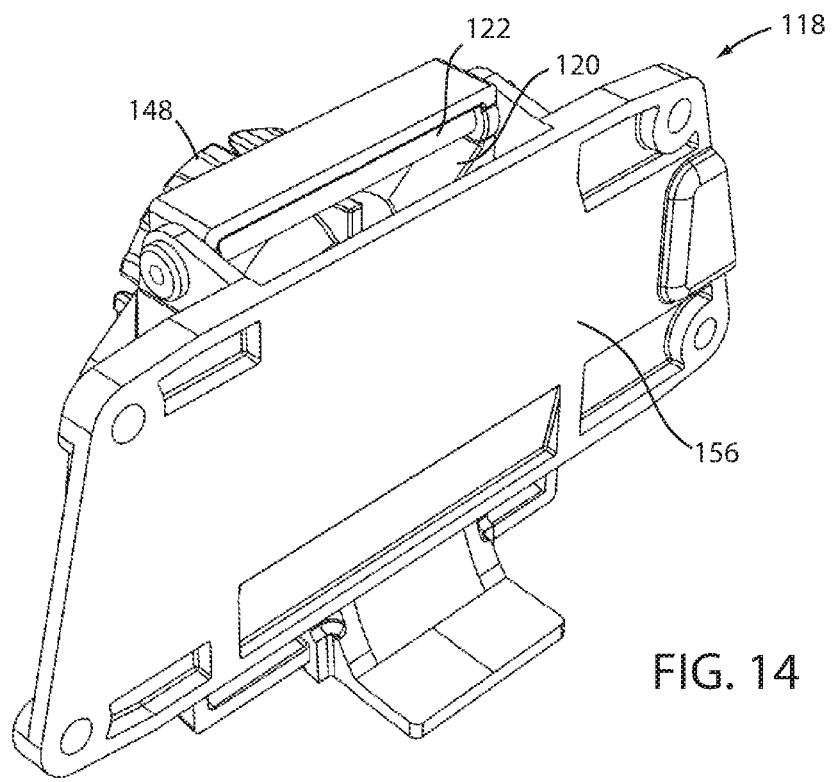
FIG. 14 is a front perspective view of the actuation mechanism of FIG. 13 in a second condition.
Figure 15:
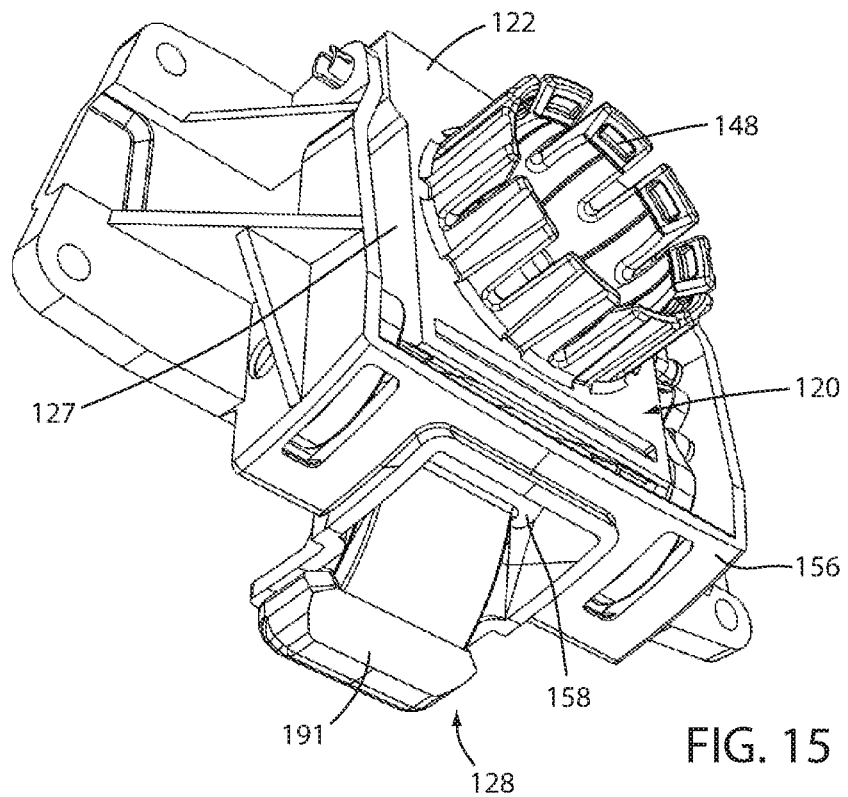
FIG. 15 is a rear perspective view of the actuation mechanism of FIG. 13 in the first condition.
Figure 16:
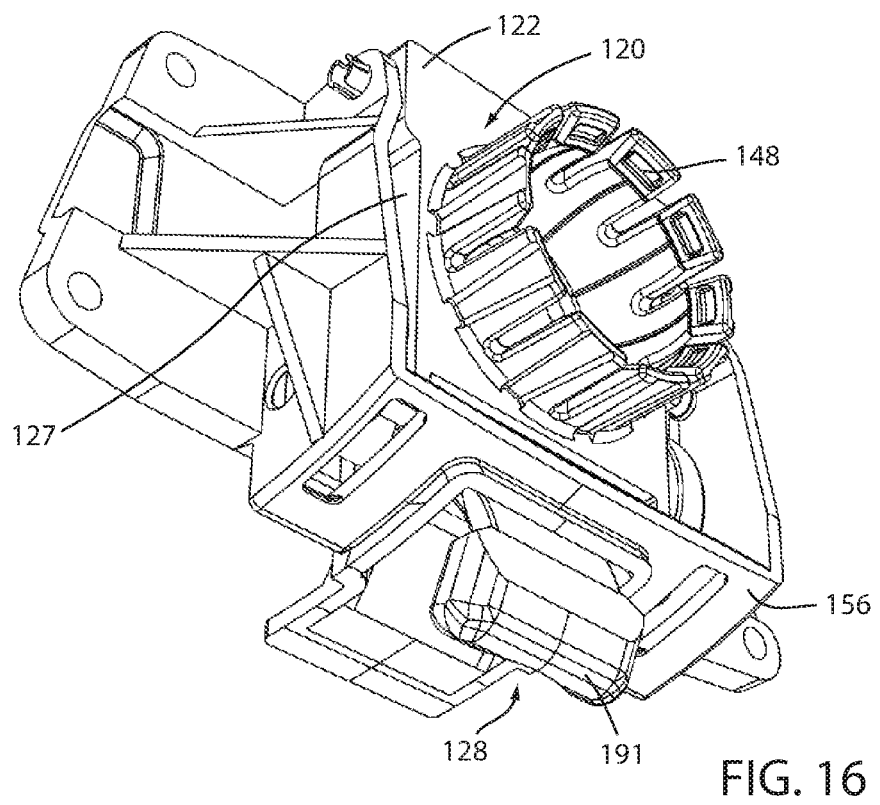
FIG. 16 is a rear perspective view of the actuation mechanism of FIG. 13 in the second condition.
Figure 17:
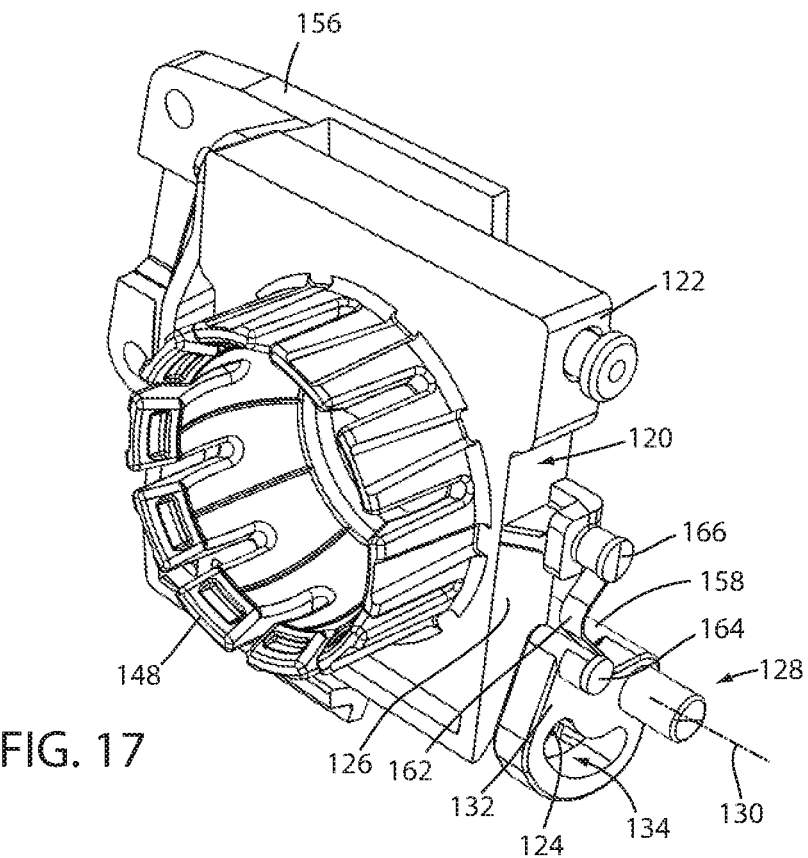
FIG. 17 is a front perspective view of the actuation mechanism of FIG. 13 in the first condition with portions thereof removed to show additional internal features.
Figure 18:
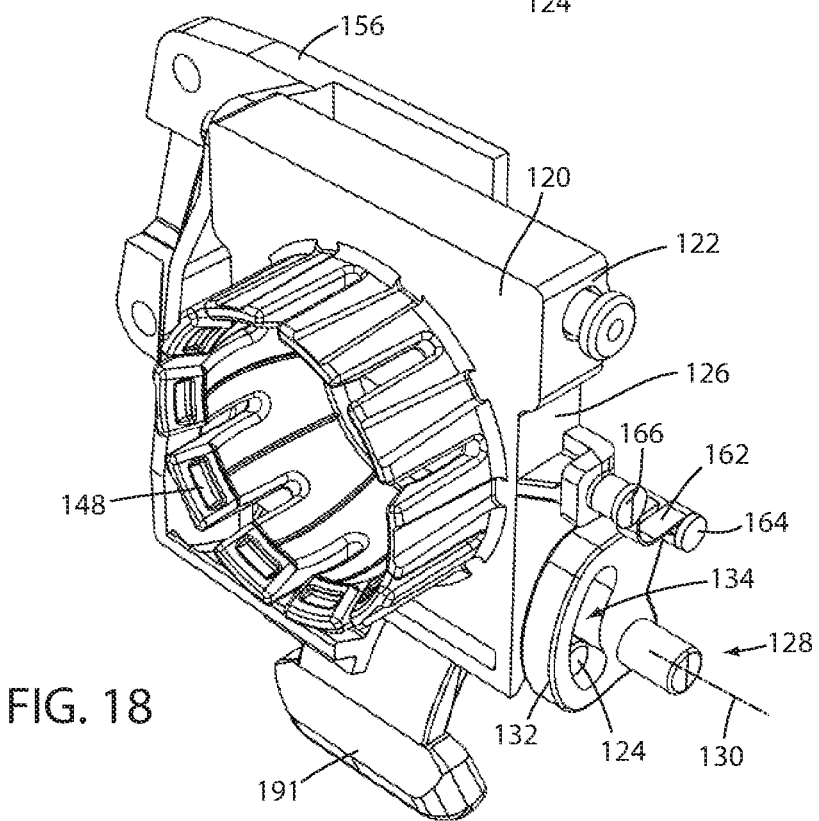
FIG. 18 is a front perspective view of the actuation mechanism of FIG. 17 with portions removed in the second condition.

As shown in the cross-section views of FIGS. 11 and 12, mounting arm 42 can couple with actuation mechanism 18 by attachment with mounting plate 20 thereof by a ball and socket coupling 48. This arrangement can allow for the above-mentioned general adjustment of substrate 46 so as to position substrate 46 at a desired position with respect to the driver for viewing of the image viewable on substrate 46 in, for example a "day" mode. As described further below, movement of lever 91 from the first position to the second position, for example, can cause movement of housing 14 relative to mounting plate 20, while mounting plate 20 remains generally static. Such a configuration can allow substrate 46 to toggle between the positions for substrate 46 provided by the above-referenced stable conditions of actuation mechanism 18 without changing the positions themselves.

Figure 10:
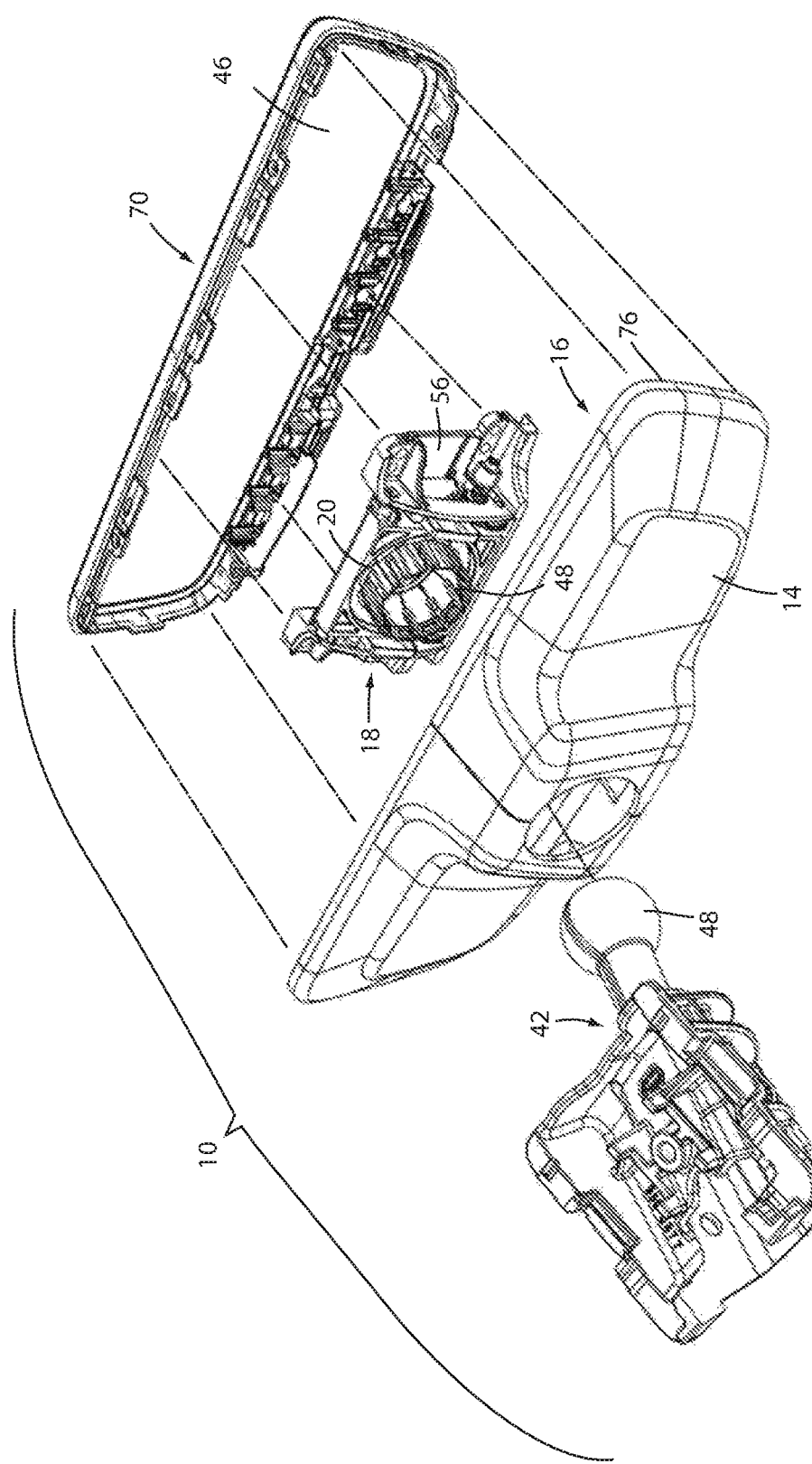
FIG. 10 is an exploded view of the rearview mirror of FIG. 1 including the actuation mechanism of FIG. 3.

Referring to FIGS. 1 and 2, as well as FIGS. 10 and 11, housing 14 is shown in the form of a single-piece unit, and can further be made from a single piece of injection molded plastic or the like, although other materials are possible. Substrate 46 can be coupled to housing 14 by way of a bezel 74 or other secondary housing piece to fix substrate 46 over an open side 76 of housing 14. In another example, substrate 46 can be coupled directly to housing 14 over open side 76. In either example, housing 14 is structured so that interior cavity 16 is of a sufficient depth to retain internal structures thereof, including actuation mechanism 18, and other related structures.

Figure 9:
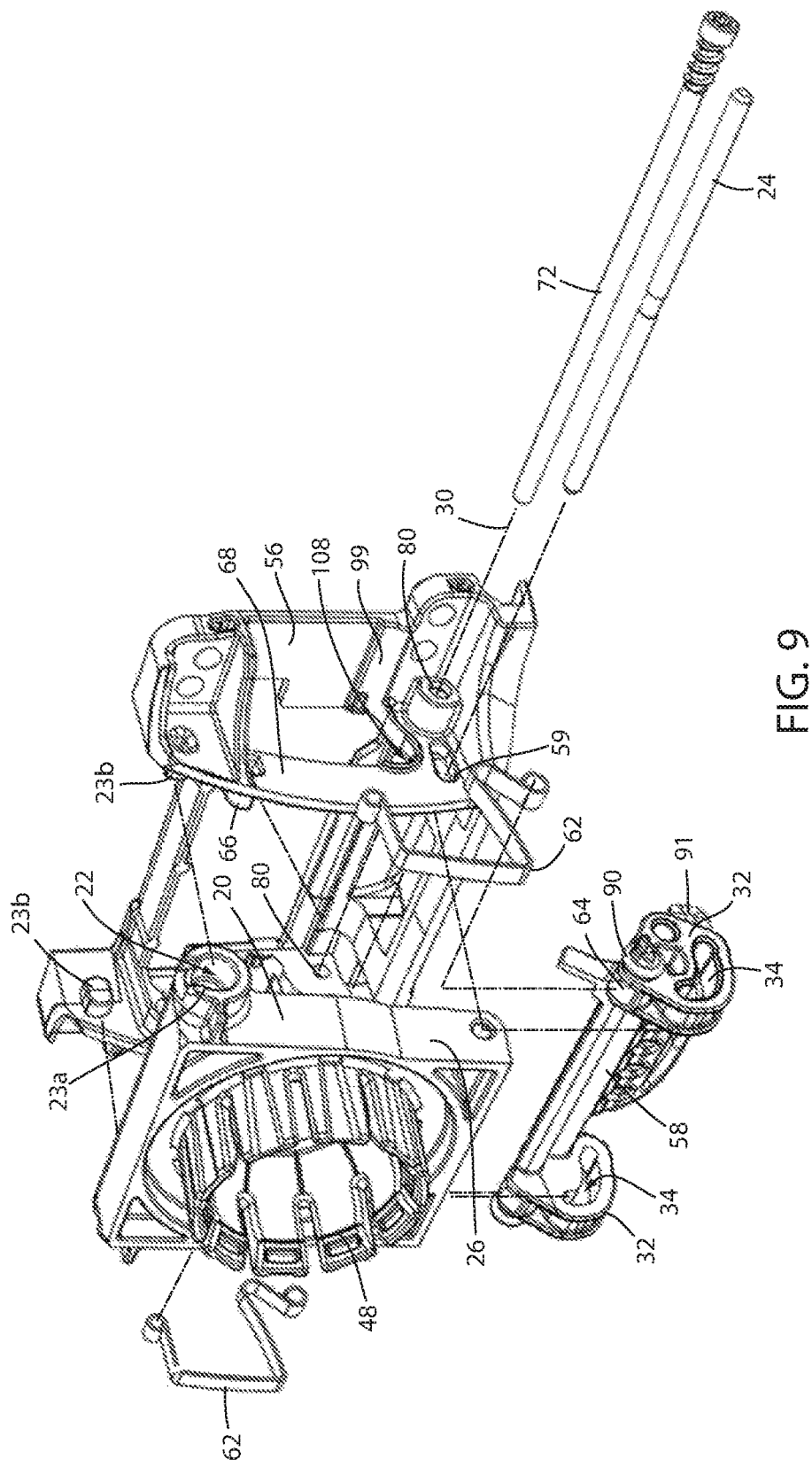
FIG. 9 is an exploded view of the actuation mechanism.
Figure 31A:
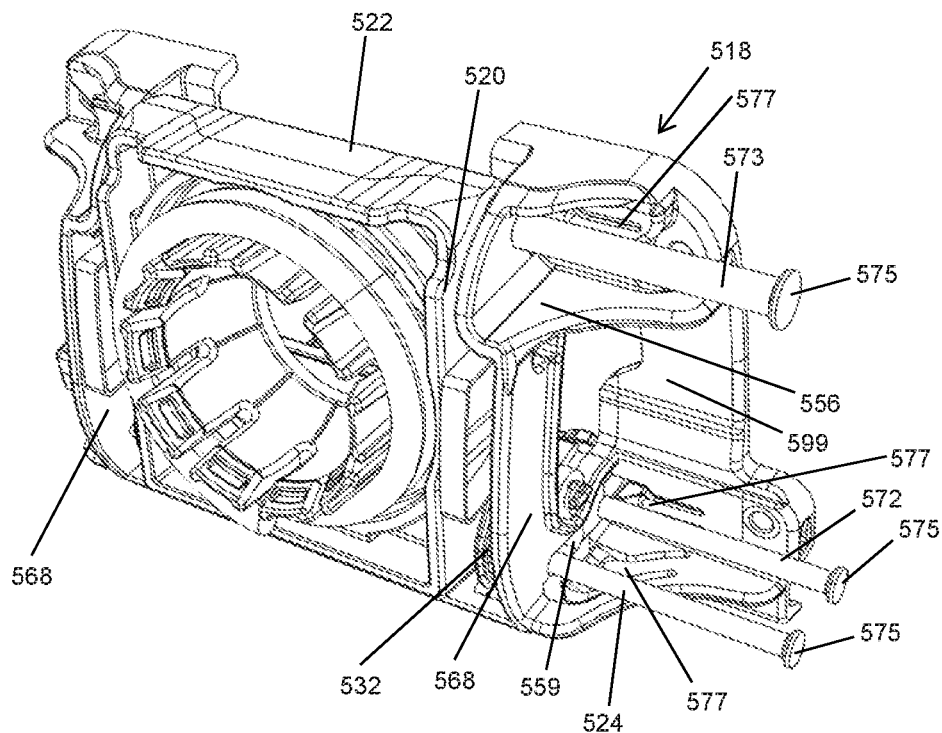
FIG. 31A is a perspective view of a further alternative actuation mechanism during an assembly

As shown in FIGS. 9 and 12, mounting plate 20, as described above, is rotatably coupled with substrate 46 at first end 22 thereof. As illustrated in FIG. 9, mounting plate 20 is rotatably coupled with a supporting plate 56 with which ribs 68 are integrally formed. In the example shown, mounting plate 20 is operatively coupled with supporting plate 56 by a pair of interengaging pivot elements 23a,23b respectively included in mounting plate 20 and ribs 68. In an alternative embodiment shown in FIGS. 31 and 32 (discussed further below), a pin 573 can extend through holes 80 in ribs 68 and through first end 22 of mounting plate 20 to replace pivot elements 23a,23b for rotational coupling of mounting plate 20 with supporting plate 56. In either arrangement, supporting plate 56 is then rigidly coupled with substrate 46, such as by coupling with subassembly 70 that includes substrate 46 and additional associated structures, including those related to the integrated display of such embodiments of mirror 10 and bezel 74, which may be assembled with and may support substrate 46. In such a construction, housing 14 may be generally cosmetic and may be assembled, such as by snap-fit or the like, with subassembly 70. In alternative configurations, mounting plate 20 can be coupled directly with housing 14, such as by incorporation of interengaging hinge portions into first end 22 of mounting plate 20 and received within a corresponding location in housing 14, or supporting plate 56 can mount with housing 14. As also shown in FIGS. 11 and 12, mounting plate 20 can generally extend through a majority of a vertical height of housing 14.

Referring now to FIGS. 3-12, actuation mechanism 18 is shown that can achieve motion of an associated rearview mirror housing 14 and substrate 46 through rotation of toggle unit 28, as driven by lever 91, for example. As illustrated, mounting plate 20 is rotatably coupled with a supporting plate 56 about first end 22 thereof. As further shown, first pin 24 in the form of, and also referred to herein as "cam pin" 24 is assembled with mounting plate 20 at a location spaced from first end 22. Cam pin 24 extends outwardly from side 26 of mounting plate 20 so as to be received within track 34 of cam body 32 that is fixed with barrel 58 of toggle unit 28. Barrel 58 defines the portion of toggle unit 28 that is positionally fixed with housing 14 and substrate 46. As shown in FIG. 9, such coupling is achieved by assembly of toggle pin 72 along axis 30 through toggle barrel 58 and with corresponding holes 80 in ribs 68 of supporting plate 56. Further, lever 91 also extends from barrel 58 such that manipulation of lever 91 can cause rotation of barrel 58. In the illustrated embodiment, toggle unit 28 is an integral structure that may, for example, be a unitary piece of molded plastic or the like. Cam body 32, by way of barrel 58 rotation about axis 30 rotates through an angle 82 about axis 30 between the first position illustrated in FIGS. 3, 5, 7, and 11 (which may correspond to an active video display condition or a night mode, depending on the particular implementation of rearview mirror 10) and downwardly-angled second position of mirror 10 illustrated in FIGS. 4, 6, 8, and 12 which may correspond with a mirror mode of a video display or day mode of a standard mirror.

As shown in FIG. 9, cam pin 24 can also be received through respective slots 59 in the ribs 68 that are positioned outside mounting plate 20 and cam bodies 32. This arrangement may provide for additional stability for actuation mechanism 18 and may further provide for ease of assembly of actuation mechanism 18 by assembly of cam pin 24 through one of slots 59 and through cam track 34 and mounting plate 20 before passing out of the opposite side of mounting plate 20 to extend through the opposite cam track 34 and, optionally, into an opposite slot 59. In a similar manner, toggle pin 72 can be slid through hole 80 in supporting plate 56 and through toggle barrel 58 and into engagement with an opposite hole 80 to retain toggle barrel 58 with supporting plate 56. As further shown, a portion of toggle pin 72 can be threaded to mate with similar threads within one of holes 80 to securely assembly toggle pin 72 with supporting plate 56. In the alternative arrangement shown in FIGS. 31 and 32 (discussed further below), cam pin 524 and toggle pin 572, as well as the additional upper pin 573, discussed above, can be arranged for snap-fit retention with supporting plate 556.

As illustrated in FIGS. 11 and 12, track 34 defines first end 50 and second end 53 that are spaced apart about axis 30 by an angle that generally corresponds with the angle 84 of rotation of lever 91 between the aforementioned first and second position. Further, track 34 is incorporated into cam body 32 such that first end 50 is farther from axis 30 than second end 53. The difference in the distance 54 between second end 53 and axis 30 and distance 52 between first end 50 and axis 30 is about equal to the desired movement of axis 30 with respect to cam pin 24 to achieve movement of supporting plate 56 with respect to mounting plate 20. In this manner, an inwardly extending portion 60 of track 34 is defined between first end 50 and second end 53.

As further illustrated in FIGS. 11 and 12, rotation of barrel 58 (FIG. 5), such as by a force on lever 91, can cause rotation of cam body 32 through angle 84 to achieve movement of cam body 32 into the second position illustrated in FIG. 12. This movement causes corresponding movement of axis 30 toward cam pin 24 by the above described shape of track 34, thereby causing movement of supporting plate 56 through angle 84, as shown in FIG. 12. Corresponding return of supporting plate 56 to the upward position illustrated in FIG. 11 can be achieved by applying an opposite force to lever 91, thereby causing rotation of cam body 32 through angle 84 in the reverse direction, and returning cam body 32 to the first position. This, correspondingly, moves axis 30 farther from cam pin 24, causing return of supporting plate 56 to the original position shown in FIG. 11.

As illustrated in FIGS. 3-12, toggle unit 28 may include identical cam bodies 32 on opposite ends of barrel 58 to provide stable movement of supporting plate 56 with respect to mounting plate 20. To achieve engagement with the opposite cam bodies 32, cam pin 24 extends through mounting plate 20 so as to also extend away from second side 27 of mounting plate 20 opposite first side 26. In this manner, cam pin 24 can respectively engage with tracks 34 in each of the cam bodies 32 in the manner described above.

As further shown, spring 62 can be affixed between cam body 32 and supporting plate 56 such that the operable coupling of mounting plate 20 with toggle unit 28 provides two stable positions for toggle unit 28 that correspond to the first (FIG. 11) and second (FIG. 12) positions for housing 14, which are angularly spaced-apart from each other by angle 84, which may be between about 5° and about 10° (and in an embodiment about 7°). Further, such rotation of housing 14 about mounting plate 20 can be achieved through rotation of toggle unit 28 through an angle 84 of between about 45° and 100° and in one embodiment about 55°, for example.

As discussed above, rotation of toggle unit 28 drives rotation of the housing 14 about the mounting plate 20 and, accordingly, the mirror substrate 46 itself either upward or downward, depending on the direction of the toggle unit 28 rotation. Spring 62 can engage with coupling detent 64 on cam body 32 that is positioned at a point that moves closer to and then back away from the opposite coupling detent 66 of spring 62, which is fixed to rib 68 of supporting plate 56, during rotation of toggle unit 28 between the first and second stable positions (FIGS. 11 and 12). Such movement, accordingly, compresses spring 62 during rotation of toggle unit 28 toward a midpoint of the total angle 84 of rotation.

Continued rotation, including to the second stable position (FIG. 12), allows spring 62 to return to a comparatively less compressed condition, as the coupling detents 64 and 66 move away from each other. The spring force caused within the spring 62 by movement of cam body 32, particularly of the coupling detent 64 of spring 62 therewith causes the spring 62 to exert a torque on the toggle unit 28 toward whichever side of an inflection point of the toggle unit 28 that the coupling detent 64 is on. In this manner, and as applicable, the spring 62, in turn, applies a moment to the mounting plate 20, which maintains cam pin 24 against the corresponding end 50 or 53 of track 34 and, thus, in the corresponding stable position. The torque on the toggle unit 28 opposes this force and in turn provides haptic feedback to the operator regarding the state of the actuation mechanism 18. By configuring the actuation mechanism 18 with opposite endpoints to the rotation of toggle unit 28, the spring force of the spring 62 can urge rotation of the toggle unit 28 to one of the endpoints of rotation thereof, i.e. opposite stable positions. Spring 62 can be tuned to provide the above-noted stable positions for actuation mechanism 18 and, accordingly, rearview mirror 10. The spring 62 shown in the present embodiment is shaped to provide clearance for and routing around other internal structures of mirror 10 not depicted, including cables and the like associated with substrate 46 when including a display. Spring 62 is also shaped to engage with channel 95 in cam body 32 for stabilization of spring 62 when mirror 10 is in the second stable position.

As shown, spring 62 is maintained in engagement with the respective coupling detents 64 and 66 by force of the spring 62 itself, which may have a natural shape greater than the spacing between detents 64 and 66. In this manner, spring 62 can be compressed during assembly to fit within detents 64 and 66 when released. Other arrangements for the coupling of spring 62 between cam body 32 and supporting plate 56 are possible, including the receipt of spring 62 on respective tabs or the like that can be molded or otherwise fixed with cam body 32 and supporting plate 56, respectively. As further illustrated, two springs 62 can be separately mounted on respective sides and of supporting plate 56 (i.e. sides of supporting plate 56 respectively adjacent first 26 and second 27 sides of mounting plate 20), with appropriate tuning of such springs 62. Alternatively a single spring 62 can be included, such as on first side 26 of mounting plate 20. As mentioned above, in an alternative embodiment, mounting plate 20 may be rotatably coupled with housing 14. In such an arrangement, spring 62 may be engaged between mounting plate 20, as described above, and a portion of housing 14, including with a rib formed therein that is similarly positioned with respect to mounting plate 20 as ribs 68 of supporting plate 56, described herein. Further, an embodiment in which mounting plate 20 is directly rotatably coupled with substrate 46 and/or another portion of subassembly 70 is contemplated with spring 62 being coupled between mounting plate 20 and an adjacent feature of substrate 46 or subassembly 70.

In the depicted embodiment, track 34 is structured such that inwardly extending portion 60 extends in a generally arced manner between respective first and second detent portions 96,98 respectively adjacent first end 50 and second end 53 that diverge from the extending portion 60 of track 34. In this manner, when cam pin 24 is within either detent portion 96,98, additional internal friction is present within actuation mechanism 18 that may further maintain mirror 10 in the desired upward (FIG. 11) or downward (FIG. 12) state. In particular, detent portions 96 and 98 are arranged to extend generally normal to the direction of rotation of mounting plate 20 with respect to supporting plate 56. In this manner, the presence of cam pin 24 within detent portions 96 and 98 in the respective stable positions serves to oppose rotation of mounting plate 20 and, accordingly, substrate 46 out of the stable position by movement of any portion of rearview mirror 10 other than lever 91. In particular, manipulation of housing 14 and/or substrate 46 by a user to adjust the position of substrate 46 about mounting arm 42 can result in a force on substrate 46 in the direction of rotation of mounting plate 20 about supporting plate 56. The above-described configuration of detent portions 96 and 98 serves to oppose this movement such that the desired adjustment is achieved within the ball and socket joint 48, as intended, without inadvertent movement of actuation mechanism 18. In this manner, spring 62 is not relied upon to oppose such inadvertent movement and is, effectively, decoupled from mounting plate 20 such that adjustments to the configuration of spring 62 for purposes of providing the desired haptic feedback to lever 91 does not impact the ability of actuation mechanism 18 to resist inadvertent movement. Other arrangements for track 34 are possible, including one lacking either or both of the depicted detent portions 96,98.

As further depicted in the FIGS. 3-10, bumper 90 may be fixed with cam body 32 in a position to engage with respective features of supporting plate 56 in the first and second stable positions. In particular, bumper 90 may contact notch 97 in rib 68 when toggle unit 28 is in the position corresponding with the first stable position of rearview mirror 10 and may contact a portion of major surface 99 of supporting plate 56 when toggle unit 28 is in the position corresponding with the second stable position of mirror 10. Bumper 90 may include or be comprised of an elastomeric or other comparatively low-durometer material such that contact with notch 97 and surface 99 provide cushioning for toggle unit 28 and, accordingly, actuation mechanism 18 as a whole when moving into either the first or second stable position under force of spring 62, as well as reduction or elimination of noise and/or vibration when actuation mechanism 18 is in either stable position.

The movement of housing 14 relative to mounting arm 42 is, thusly, facilitated by the rotation of toggle unit 28 causing the desired rotation of supporting plate 56 about first end 22 of mounting plate 20. As discussed above, housing 14 defines an aperture (FIGS. 11 and 12) positioned adjacent mounting plate 20 such that mounting arm 42 can pass therethrough, thus allowing mounting plate 20 to couple with mounting arm 42 to retain rearview mirror 10 in an adjustable position with respect to windshield 38 or headliner 40. Accordingly, the above-described relative movement of housing 14 with respect to mounting plate 20 causes movement of housing 14 (and accordingly substrate 46 coupled therewith) in the form of rotation thereof about first end 22 of mounting plate 20. Such movement, in turn, moves substrate 46 between the above-described upward (FIG. 11) and downward (FIG. 12) positions. As illustrated, such orientation can be achieved by rotation of mounting plate 20 with respect to housing 14 through an angle of between about 4° and about 10°, in one embodiment about 7°, and in another embodiment about 4.5°, although such an angle can vary based on the location and structure of rearview mirror 10.

Figure 19:
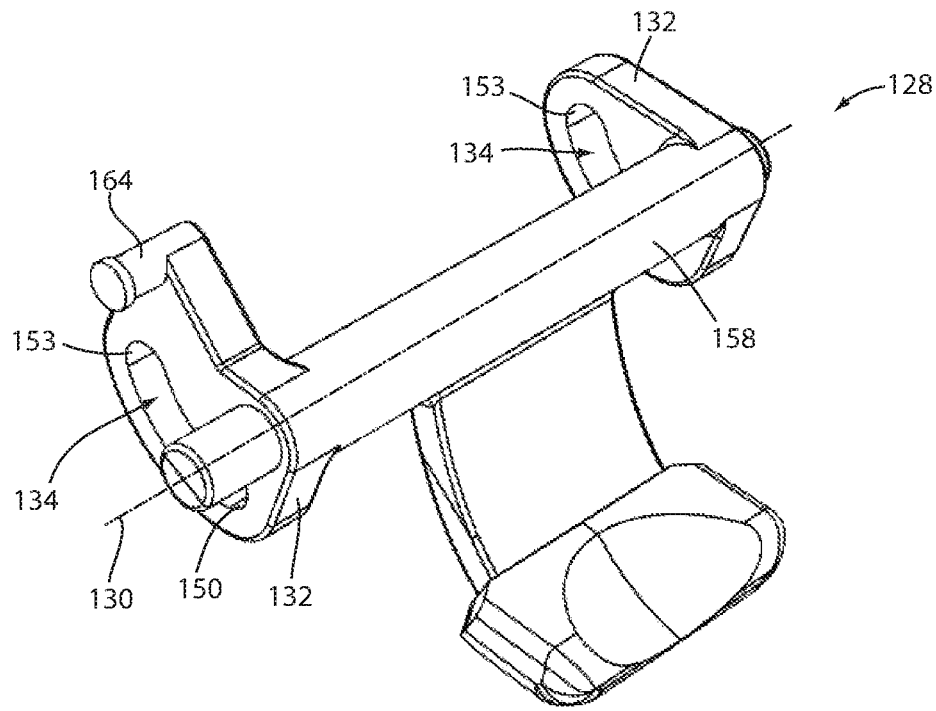
FIG. 19 is a front perspective view of a toggle unit of the actuation mechanism.
Figure 20:
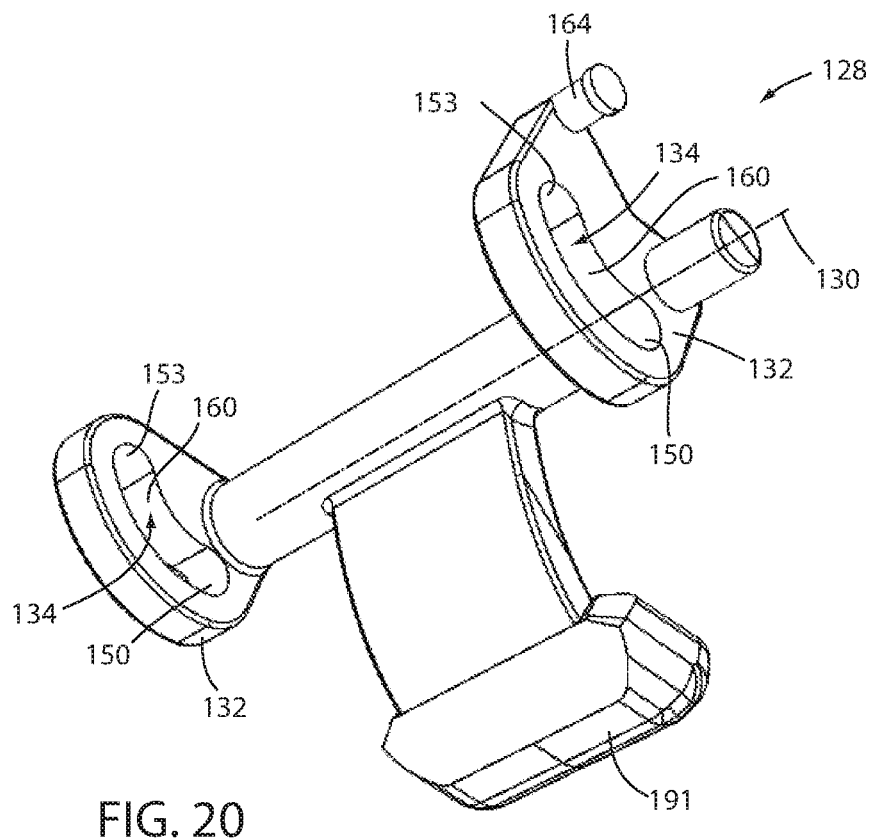
FIG. 20 is a rear perspective view of the toggle unit.

Turning now to FIGS. 13-22, an alternative actuation mechanism 118 is shown that can achieve motion of an associated rearview mirror housing 114 (FIGS. 21 and 22) through rotation of toggle unit 128, as driven by lever 191, for example. As illustrated in FIGS. 19 and 20, mounting plate 120 is rotatably coupled with a supporting plate 156 about first end 122 thereof. As further shown, pin 124 extends from side 126 of mounting plate 120 at a location spaced from first end 122. Pin 124 is received within track 134 of cam body 132 that is fixed with a barrel 158 of toggle unit 128. Barrel 158 defines the portion of toggle unit 128 that is rotatably fixed within housing 114, such as by coupling with supporting plate 156. Further, lever 191 also extends from barrel 158 such that manipulation of lever 191 can cause rotation of barrel 158. In the illustrated embodiment, toggle unit 128 is an integral structure that may, for example, be a unitary piece of molded plastic or the like. Cam body 132, by way of barrel 158 rotation about axis 130, rotates through an angle 182 (FIG. 22) about axis 130 between the first position illustrated in FIGS. 13, 15, 17, and 21 and corresponding with an upwardly-angled position of mirror 110 (which may correspond to an active video display condition or a night mode, depending on the particular implementation of mirror 10), and a second position, illustrated in FIGS. 16, 18, 20, and 22 and corresponding within a downwardly-angled position of substrate 146.

As illustrated, track 134 defines first end 150 and second end 153 that are spaced apart about axis 130 by an angle that generally corresponds with the angle 182 of rotation of barrel 158 between the aforementioned first and second position. Further, track 134 is incorporated into cam body 132 such that first end 150 is closer to axis 130 than second end 153, the difference in such distances between second end 153 and first end 150 with respect to axis 130 being about equal to the desired movement of axis 130 with respect to pin 124 to achieve movement of supporting plate 156 with respect to mounting plate 120. In this manner, an outwardly extending portion 160 of track 134 is defined between first end 150 and second end 153.

Figure 21:
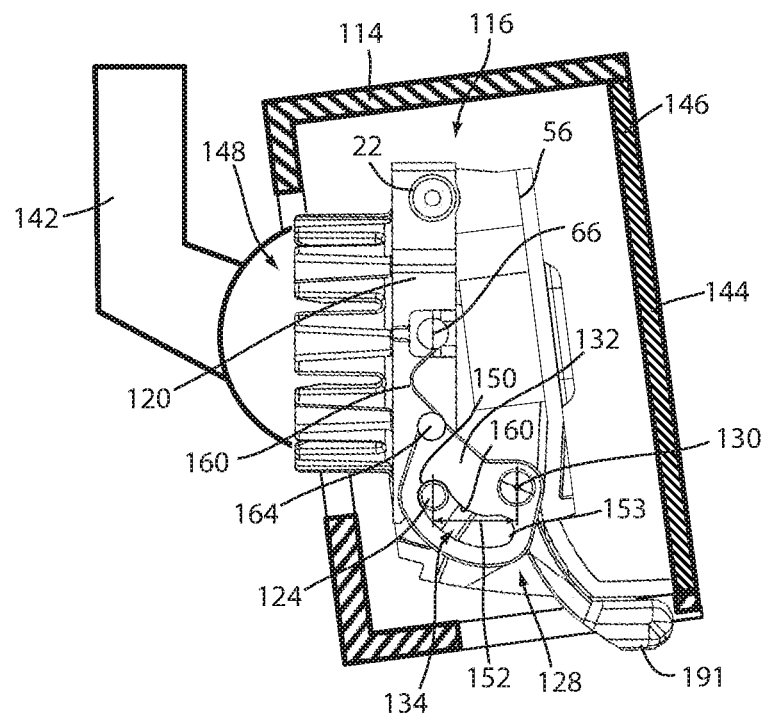
FIG. 21 is a side, partial cross-section view the actuation mechanism of FIG. 13 in the first condition assembled within a rearview mirror.
Figure 22:
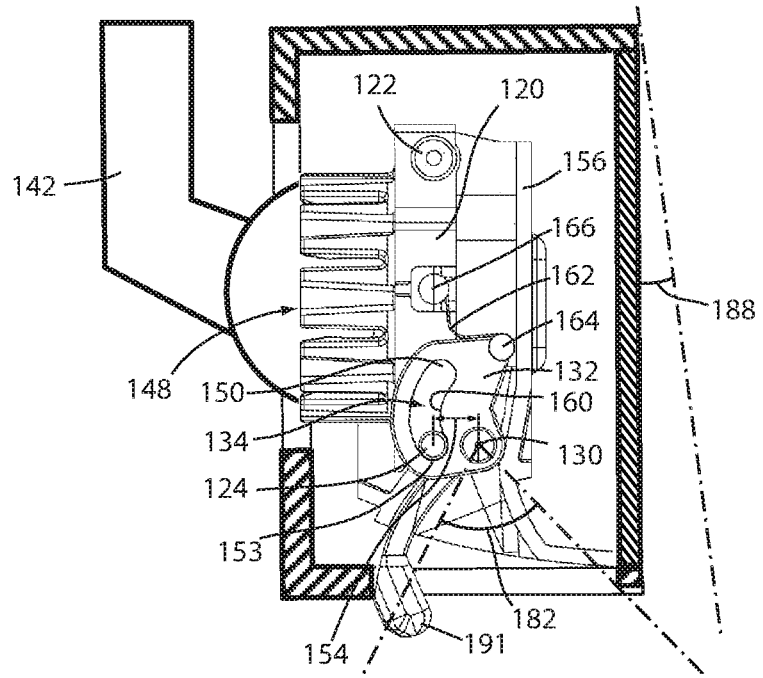
FIG. 22 is a side, partial cross-section view of the rearview mirror of FIG. 21 with the actuation mechanism thereof in the second condition.

As further illustrated in FIGS. 21 and 22, rotation of barrel 158, such as by a force on lever 191 can cause rotation of cam body 132 through angle 184 to achieve movement of cam body 132 into the second position illustrated in FIG. 22. This movement causes corresponding movement of axis 130 away from pin 124 by the above described shape of track 134, thereby causing movement of supporting plate 156 through angle 188, as shown in FIG. 22. Corresponding return of supporting plate 156 to the upward position illustrated in FIG. 21 can be achieved by applying an opposite force to lever 191, when thereby causing rotation of cam body 132 through angle 184 in the reverse direction, and returning cam body 132 to the first position. This rotation, correspondingly, brings axis 130 closer to pin 124, causing return of supporting plate 156 to the original position shown in FIG. 22.

As further shown, a spring 162 can be affixed between cam body 132 and mounting plate 120 such that the operable coupling of mounting plate 120 with toggle unit 128 provides two stable positions for toggle unit 128 that correspond to the first (FIG. 21) and second (FIG. 22) positions for housing 114, which are angularly spaced-apart from each other by angle 188 which may be between about 4° and about 10° (and in further embodiments about 7° or about 4.5°). Further, such rotation of housing 114 about mounting plate 120 can be achieved through rotation of toggle unit 128 through an angle 184 of between about 45° and 100° and in one embodiment about 55°, for example.

As discussed above, rotation of toggle unit 128 drives rotation of the housing 114 about the mounting plate 120 and, accordingly, the mirror substrate 146 itself either upward or downward, depending on the direction of the toggle unit 128 rotation. Spring 162 can be affixed to a coupling point 164 on cam body 132 that is positioned to move closer to and then back away from mounting plate 120, particularly the opposite coupling point 166 of spring 162 with mounting plate 120, during rotation of toggle unit 128 between stable positions (FIGS. 21 and 22). Such movement, accordingly, compresses spring 162 during rotation of toggle unit 128 toward a midpoint of the total angle 184 of rotation. Continued rotation, including to the second stable position (FIG. 22), allows spring 162 to return to a comparatively less compressed condition, as the coupling points 164 and 166 move away from each other. The spring force caused within the spring 162 by movement of cam body 132, particularly of the coupling point 164 of spring 162 therewith causes the spring 162 to exert a torque on the toggle unit 128 toward whichever side of an inflection point of the toggle unit 128 that the coupling point 164,166 is on. In this manner, and as applicable, the spring 162, in turn applies a moment to the mounting plate 120 holding pin 124 firmly against a corresponding end 150 or 153 of track 134 and thus in the corresponding stable position. The torque on the toggle unit 128 opposes this force and in turn provides haptic feedback to the operator regarding the state of the actuation mechanism 118. By configuring the actuation mechanism 118 with opposite endpoints to the rotation of toggle unit 128, the spring force of the spring 162 can urge rotation of the toggle unit 128 to one of the endpoints of rotation thereof, i.e. opposite stable positions. Spring 162 can be tuned to provide the above-noted stable positions for actuation mechanism 118 and, accordingly, rearview mirror 110.

The movement of housing 114 relative to mounting arm 142 is, thusly, facilitated by the rotation of toggle unit 128 causing the desired rotation of supporting plate 156 about first end 122 of mounting plate 120. As discussed above, housing 114 defines an aperture (FIGS. 21 and 22) positioned adjacent mounting plate 120 such that mounting arm 142 can pass therethrough, thus allowing mounting plate 120 to couple with mounting arm 142 to retain rearview mirror 110 in an adjustable position with respect to windshield 38 or headliner 40. Accordingly, the above-described relative movement of housing 114 with respect to mounting plate 120 causes movement of housing 114 (and accordingly substrate 146 coupled therewith) in the form of rotation thereof about first end 122 of mounting plate 120. Such movement, in turn, moves substrate 146 between the above-described upward (FIG. 21) and downward (FIG. 22) positions. As illustrated, such orientation can be achieved by rotation of mounting plate 120 with respect to housing 114 through an angle of between about 5° and about 10°, and in one embodiment about 7°, although such an angle can vary based on the location and structure of rearview mirror 110.

As illustrated in FIGS. 13-22, toggle unit 128 may include identical cam bodies 132 on opposite ends of barrel 158 to provide more stable movement of supporting plate 156 with respect to mounting plate 120. In this manner mounting plate 120 can include two pins 124 on opposite sides 126 and 127 thereof that can respectively engage with tracks 134 in each of the cam bodies 132 in the manner described above. In such an embodiment, a single spring 162 can be included, such as on first side 126 of mounting plate 120. Alternatively two springs 162 can be separately mounted on respective sides 126 and 127 of mounting plate 120, with appropriate tuning of such springs 162.

Figure 23:
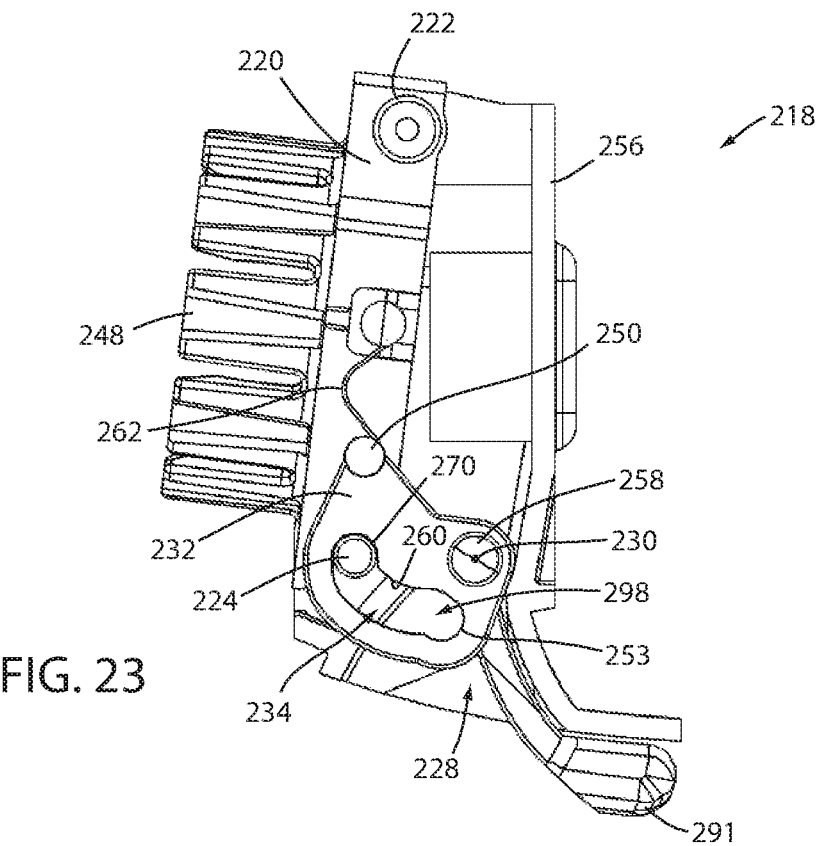
FIG. 23 is a side, partial view of a further alternative actuation mechanism useable in the rearview mirror of FIG. 1 with the actuation mechanism thereof in a first condition.
Figure 24:
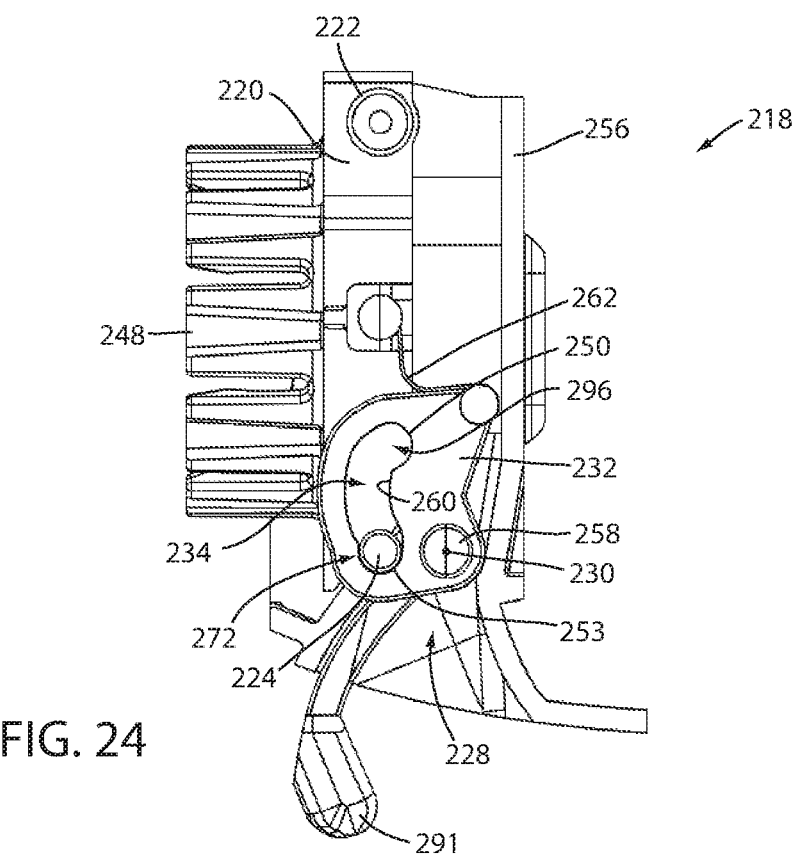
FIG. 24 is a side, partial cross-section view of the actuation mechanism of FIG. 23 in a second condition.

In an alternative embodiment shown in FIGS. 23 and 24, similar cam bodies 232 are included on opposite ends of a barrel 258 in an actuation mechanism 218 that is generally similar to that which is discussed above in FIGS. 13-22. However, as illustrated, track 234 is structured such that outwardly extending portion 260 may extend in a generally arced manner between respective first and second detent portions 270,272 respectively adjacent first end 250 and second end 253 that diverge from the arced portion 260. In this manner, when pin 224 is within either detent portion 270,272, additional internal friction is present within actuation mechanism 218 that may further maintain the corresponding rearview mirror 210 in the desired upward (FIG. 23) or downward (FIG. 24) state.

An alternative embodiment of actuation mechanism 318 useable with rearview mirror 10, as depicted in FIGS. 1 and 2, is shown in FIGS. 25-28. As shown, toggle unit 328 includes oppositely-disposed cam bodies 332 on opposite ends of toggle barrel 358 with which lever 391 is fixed. Cam bodies 332 define identical lobed profiles 334 that engage within respective openings 359 in ribs 368 of supporting plate 356. The lobed profiles 334 and corresponding openings 359 are shaped to move cam bodies 332 and, accordingly, toggle barrel 358 along an eccentric path 361 with rotation of lever 391 between first and second engaged positions shown respectively in FIGS. 25 and 26.

Figure 25:
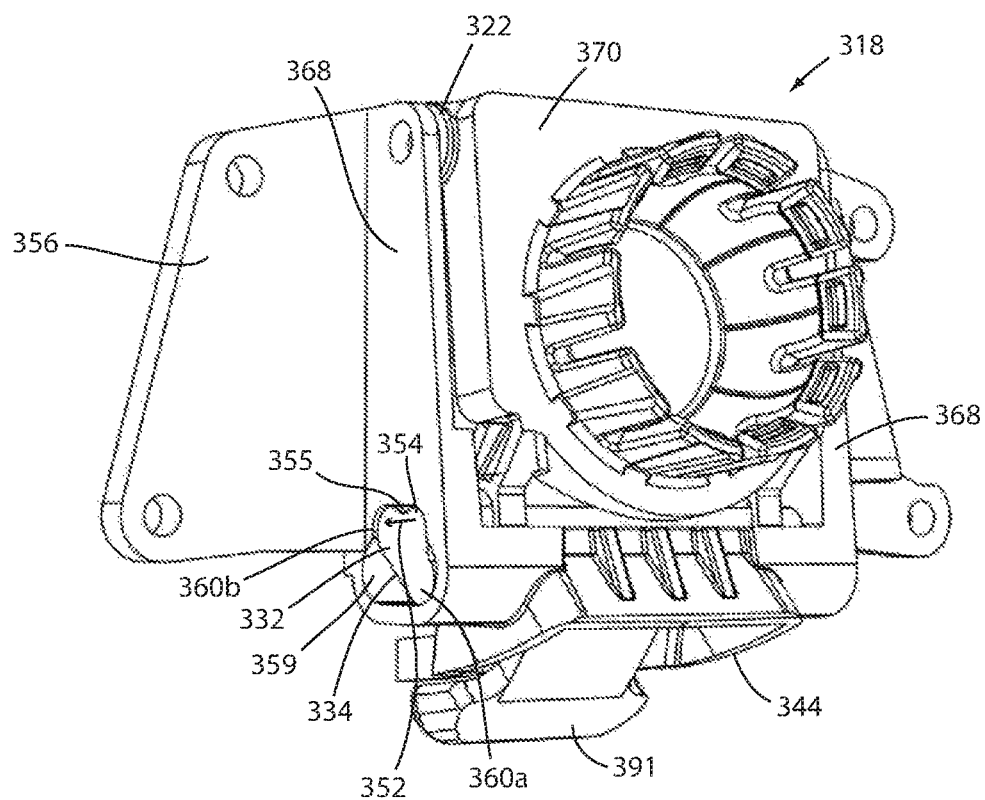
FIG. 25 is a rear perspective view of a further alternative actuation mechanism in a first condition, the actuation mechanism being similarly useable in the rearview mirror of FIG. 1.
Figure 28:
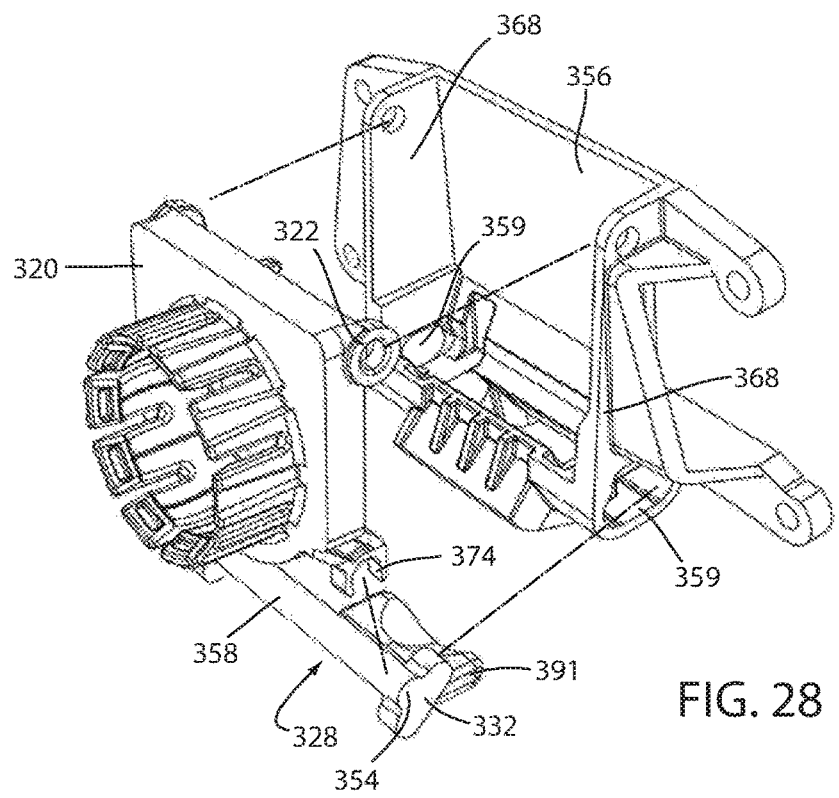
FIG. 28 is an exploded view of the actuation mechanism of FIG. 25.

The eccentric path 361 includes movement of upper lobe 354 in horizontal direction 352 between opposite ends of upper side 355 of opening 359. This movement is driven, at least in part, by movement of lower lobes 360*a* and 360*b* alternately into and out of upper side 355, such opposite movement driving upper lobe 354 away from the end of upper side 355 corresponding with the respective one of lower lobe 360*a* or 360*b*. As shown in FIG. 28, toggle barrel 358 is generally aligned with upper lobe 354 such that the horizontal movement of upper lobe 354 causes similar movement of toggle barrel 358 in the horizontal direction 352 (FIG. 25). As further illustrated, toggle barrel 358 is received within a lower fork 374 of mounting plate 320 that fixes first end 322 of mounting plate 320 with toggle barrel 358 in horizontal direction 352, while allowing toggle barrel 358 to move vertically, as dictated by the eccentric path 361 of cam bodies 332, including through the intermediate position shown in FIG. 27. In this manner, movement of upper lobe 354 between opposite ends of upper side 355 of opening 359 causes rotation of supporting plate 356 with respect to mounting plate 320 in a manner similar to that which is discussed above with respect to actuation mechanism 318.

Figure 26:
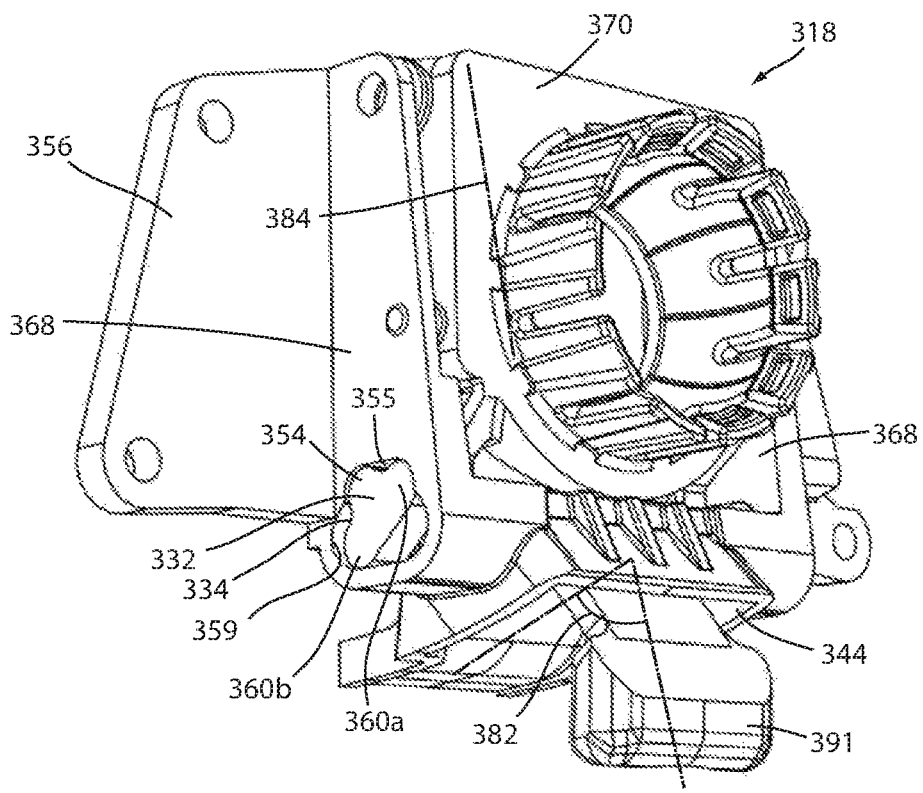
FIG. 26 is a rear perspective view of the actuation mechanism of FIG. 25 in a second condition.
Figure 27:
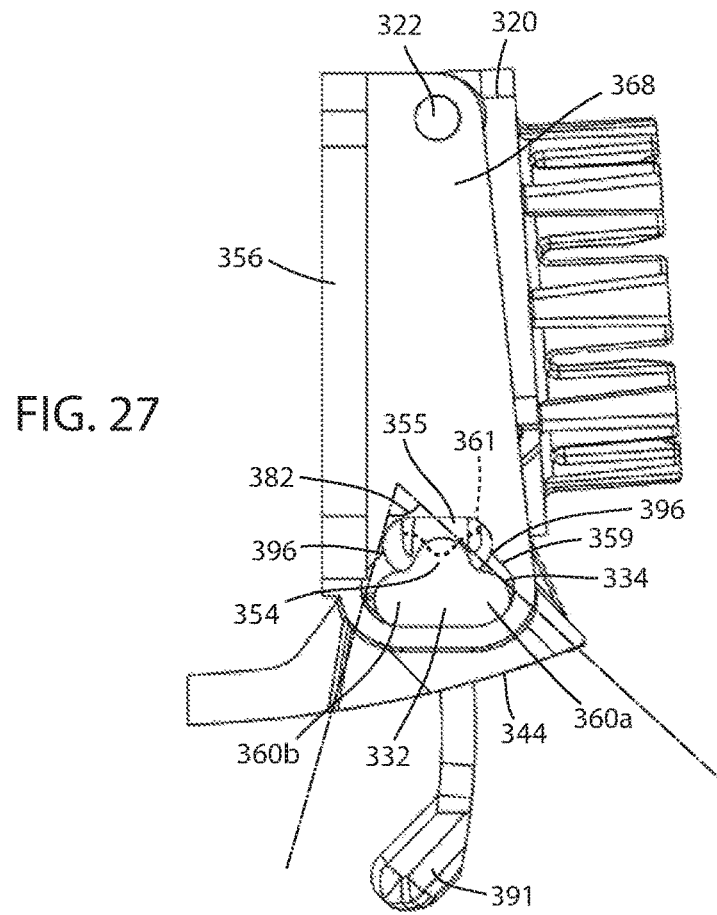
FIG. 27 is a side view of the actuation mechanism of FIG. 25 in an intermediate position between the first and second conditions.

Both the profile 334 of cam body 332 and the shape of opening 359 can be shaped such that when either of lower lobes 360*a* or 360*b* is received within upper side 355 of opening 359 with upper lobe 354 positioned oppositely therein, a locked position is maintained for cam body 332 in opening 359. As shown in FIGS. 25 and 26, these locked positions correspond with stable positions similar to those discussed above with respect to FIGS. 11 and 12. In this manner, the locked positions of cam body 332 can correspond with similar stable positions of actuation mechanism 318 that can provide for similar movement of an associated substrate for use as described above.

Figure 29:
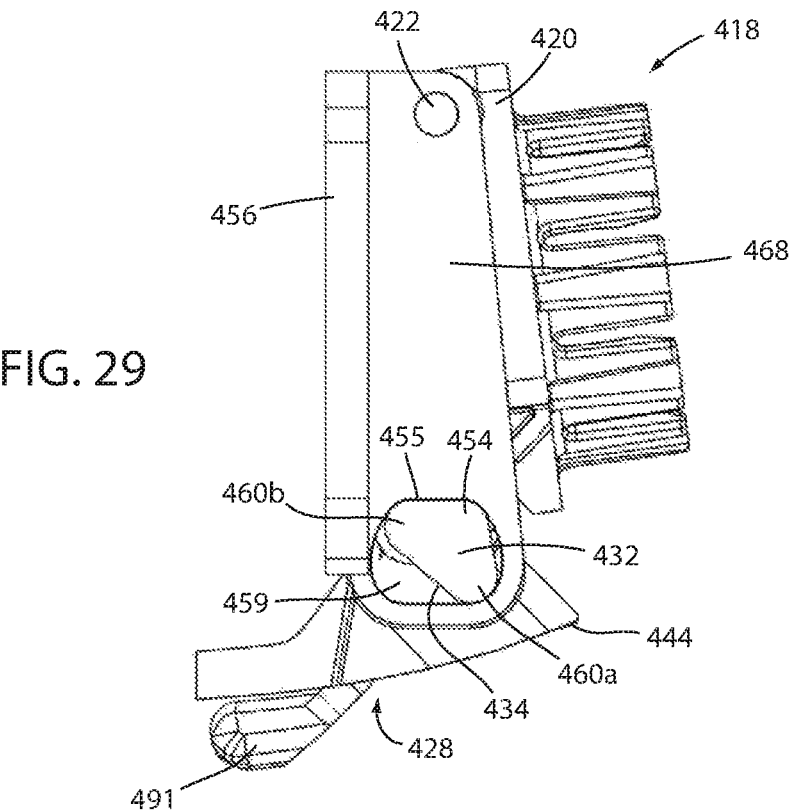
FIG. 29 is a side view of a still further alternative actuation mechanism in a first condition, the actuation mechanism being useable in the rearview mirror of FIG. 1.
Figure 30:
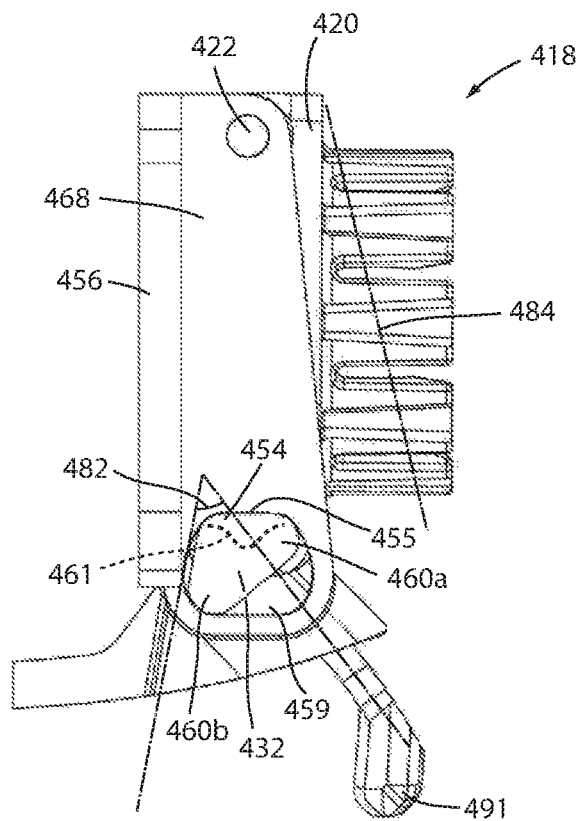
FIG. 30 is a side view of the actuation mechanism of FIG. 29 in a second condition.

In particular, the shape of profile 334 separately defines the various lobes 354, 360*a*, and 360*b* with openings 359 being shaped to provide detents 396 that operate with profile 334 to provide a snap-fit engagement of cam body 332 with opening 359 in the stable positions. Alternatively, in the embodiment shown in FIGS. 29 and 30, a similar profile 434 of modified cam bodies 432 can be less defined among the lobes 454, 460*a*, and 460*b* such that, while functioning otherwise similarly, a press-fit is utilized to establish the corresponding locked positions. Such a profile 434, when incorporated in the illustrated actuation mechanism 418, which is otherwise similar to actuation mechanism 318, operates similarly to achieve movement of securing plate 456 with respect to mounting plate 420, but may provide smoother operation.

Turning now to FIGS. 31A-33, an example of actuation mechanism 518 is shown that is similar in structure and operation to actuation mechanism 18, as discussed above with respect to FIGS. 1-12 and is similarly useable in a rearview mirror 10. As mentioned above, in the variation of actuation mechanism 518 shown in FIGS. 31A and 31B, upper pin 573 is used to rotatably couple mounting plate 520 with supporting plate 556 about first end 522 of mounting plate 522. As further shown, upper pin 573, as well as toggle pin 572 and cam pin 524 are arranged to be retained with actuation mechanism by a snap-fit arrangement. In particular, each of such pins 524,572,573 includes a head 575 having a greater radius than the remaining portion of the respective pin 524,572,573 and wider than the hole or slot in the rib 68 on the side of head 575. In this manner, when each pin 524,572,573 is in a fully-assembled position (FIG. 31B), the respective head 575 abuts rib 568 in an area surrounding the associated hole or slot 559 therein to prevent further movement of the pin 524,572,573 in an inward manner.

Figure 31B:
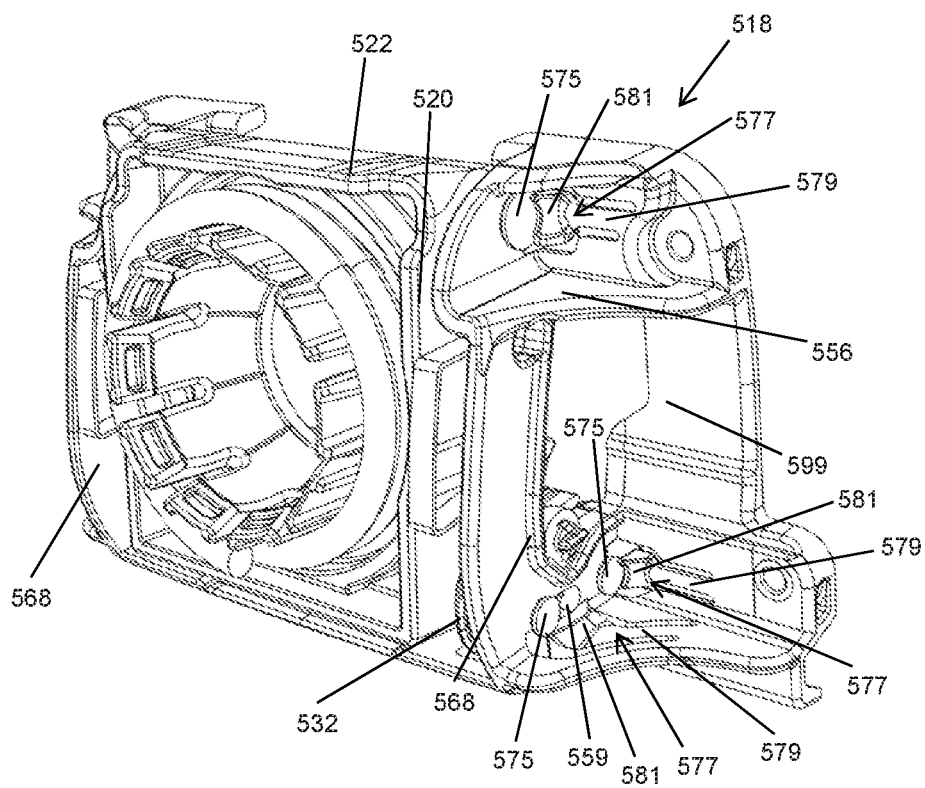
FIG. 31B is a perspective view of the actuation of FIG. 31A in a first condition, the actuation mechanism being useable in the rearview mirror of FIG. 1.
Figure 32:
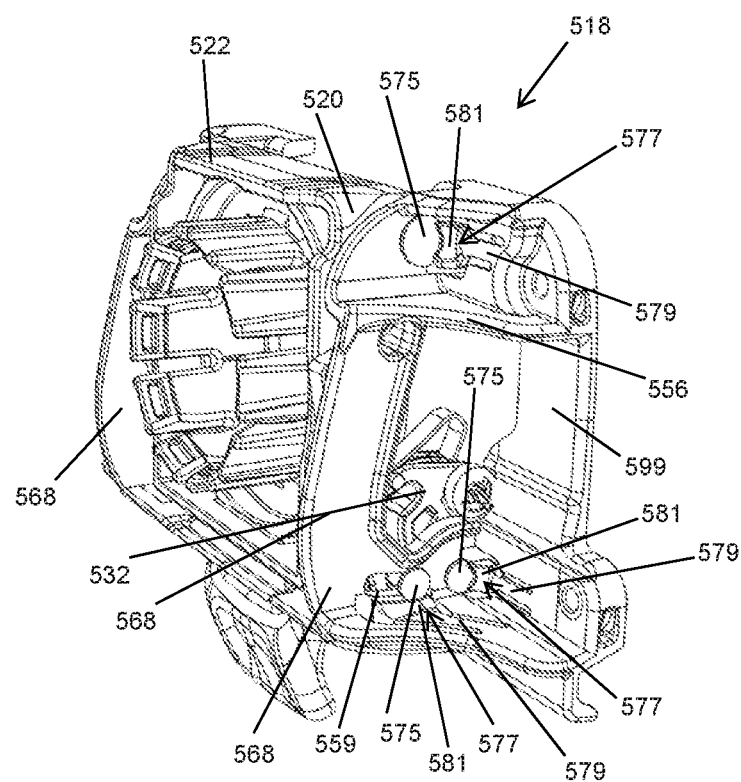
FIG. 32 is a perspective view of the actuation mechanism in a second condition.
Figure 33:
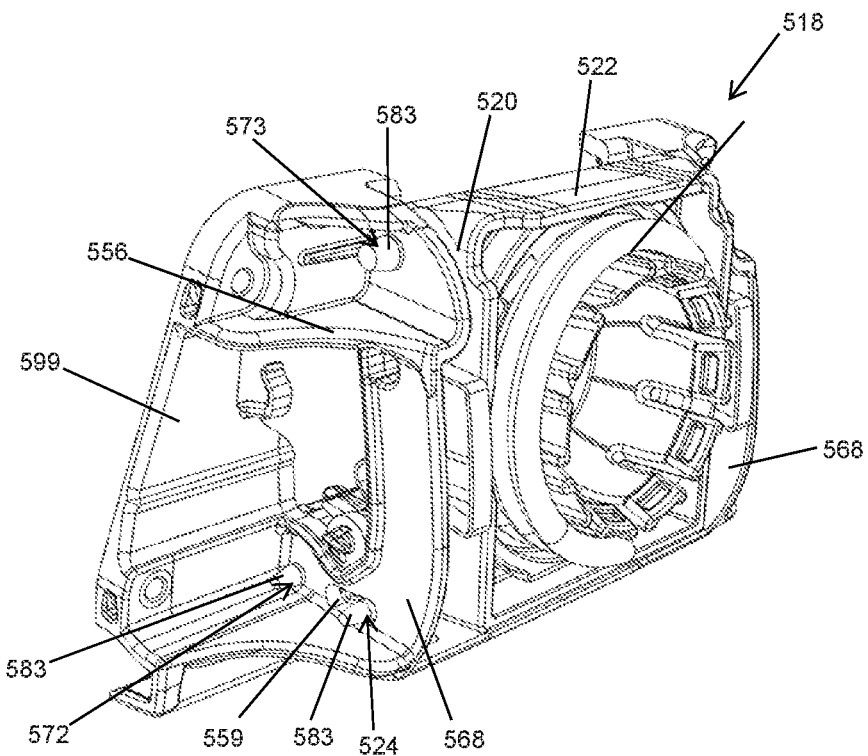
FIG. 33 is a further perspective view of the actuation mechanism of FIG. 31B.

To prevent withdrawal of the pins 524,572,573, rib 568 incorporates a plurality of snap tabs 577, each including a cantilevered body portion 579 formed within major surface 599 of support plate 556 and a ramp portion 581 extending therefrom alongside and spaced from rib 568. In this manner, pins 524,572,573 can be put into place (FIG. 31A) with the associated hole or slot 559 and then slid inward with movement of the head 575 toward rib 568 deflecting the body portion 579 of the respective tab by way of engagement with ramp portion 581 to allow for head 575 to be moved into contact with rib 568 with such movement causing head 575 to move past ramp portion 581, at which point body 579 of snap tab 577 returns to its natural position with ramp portion 581 extending inwardly over at least a portion of head 575 to retain head 575 against rib 568 (FIG. 31B). Pins 524,572,573 can be removed from such position by manual deflection of body portion 579 inward such that ramp 581 is clear of head 575, allowing pin 524,572,573 to be pulled away from rib 568 and removed. It is noted that the particular snap tab 577 associated with slot 559 can be elongated in the direction of slot 559 to retain cam pin 524 in the assembled position during movement of cam pin 524 along slot 559 resulting from rotation of toggle unit 528, as shown in FIG. 332, in a similar manner to that which is discussed above with respect to FIGS. 11 and 12. As shown in FIG. 33, the ends 583 of pins 524,572,573 opposite heads 575 can be tapered to facilitate assembly with support plate 556 and with mounting plate 520 with ends 583 protruding from the associated rib 568 when assembled with actuation mechanism 518.

In a further alternative, the actuation mechanisms 18, 118, 218, 318, and 418 described herein can be used to provide for stable positions and to prevent inadvertent movement out of such stable position in a full-display mirror having motorized movement and, accordingly, lacking a lever. Variations of such a mechanism are described in co-pending, commonly assigned U.S. patent application Ser. Nos. 15/053,252 and 15/053,290, now U.S. Pat. Nos. 9,963,074 and 9,718,409, respectively, the entire disclosures of which are hereby incorporated by reference herein.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:
1. A rearview mirror for a vehicle, comprising:
  a substrate having a reflective surface thereon; and
  an actuation mechanism coupled with the substrate, including:

a mounting plate rotatably coupled with the substrate about a first axis at a first end thereof and having a first pin extending outwardly from a side of the mounting plate along a second axis extending in a direction parallel with the first axis and spaced apart therefrom; and
a toggle unit positionally fixed with respect to the substrate and rotatable between first and second positions about a third axis parallel with the first and second axes, the toggle unit including a first cam body defining a first track having a first end at a first distance from the third axis and a second end at a second distance from the third axis that is greater than the first distance, the first pin of the mounting plate being slidably engaged with the first track.

2. The rearview mirror of claim 1, wherein:
the first pin further extends from a second side of the mounting plate opposite the first side; and
the toggle unit further includes a second cam body defining a second track, the first pin also being slidably received within the second track.

3. The rearview mirror of claim 1, wherein the first pin is an elongate member slidably engaged with an aperture in the mounting plate.

4. The rearview mirror of claim 1, further including a second pin in the form of an elongate member slidably engaging with an aperture defining the third axis and positionally fixing the toggle unit with respect to the substrate.

5. The rearview mirror of claim 1, wherein:
the mounting plate further includes a second pin opposite from and coaxial with the first pin; and
the toggle unit further includes a second cam body defining a second track, the second pin of the mounting plate being slidably received within the second track.

6. The rearview mirror of claim 1, wherein the toggle unit further includes a lever rigidly coupled with the first cam body.

7. The rearview mirror of claim 1, wherein:
rotation of the toggle unit between the first and second positions causes rotation of the substrate about the mounting plate between first and second stable positions;
the first pin is adjacent the first end of the first track in the first stable position; and
the first pin is adjacent the second end of the first track in the second stable position.

8. The rearview mirror of claim 7, wherein the track defines first and second detent portions adjacent the first and second ends, respectively.

9. The rearview mirror of claim 7, wherein:
the actuation mechanism further includes a supporting plate coupling the mounting plate with the substrate and positionally fixing the toggle unit with respect to the substrate; and
the first cam body includes a bumper affixed thereto, the bumper contacting a portion of the supporting plate when the housing is in the first stable position.

10. The rearview mirror of claim 1, further including a support plate coupled with the substrate, the mounting plate being rotatably coupled with the support plate to achieve the rotatable coupling of the mounting plate with the substrate, and a spring coupled between the first cam body and the support plate, wherein:
rotation of the toggle unit between the first position and the second position moves the spring from a first compressed position through a second compressed condition and to a third compressed condition, the second compressed condition being greater than the first and third compressed conditions.

11. The rearview mirror of claim 10, wherein:
a rotation of the toggle unit between the first and second positions causes rotation of the substrate about the mounting plate between first and second stable positions; and
the spring is respectively in the first and third compressed conditions when in the first and second stable positions, the spring driving the actuation mechanism toward an adjacent one of the first and second stable conditions when in the third compressed condition.

12. The rearview mirror of claim 10, wherein the first cam body defines a channel therein along an outer profile thereof, the channel receiving a portion of the spring therein when the toggle unit is in the second position.

13. The rearview mirror of claim 1, further including:
a housing defining an interior, an open side, and an aperture opposite the open side, the substrate being coupled over the open side of the housing with the actuation mechanism within the interior of the housing; and
a mounting arm pivotably coupled with the mounting plate and extending through the aperture.

14. The rearview mirror of claim 1, wherein the substrate is a display substrate.

15. The rearview mirror of claim 1, further including a support plate coupled with the substrate, the mounting plate being rotatably coupled with the support plate to achieve the rotatable coupling of the mounting plate with the substrate, the supporting plate including a first rib positioned laterally outside of the mounting plate and the first cam body of the toggle unit with the first cam body positioned between the mounting plate and the rib, the rib defining and a support aperture receiving the first pin therein.

16. A rearview mirror for a vehicle, comprising:
a substrate having a reflective surface thereon; and
an actuation mechanism coupled with the substrate, including:
a mounting plate rotatably coupled with the substrate at a first end thereof about a first axis and having an aperture therein extending along a second axis in a direction parallel with the first axis and spaced apart therefrom;
a toggle unit positionally fixed with respect to the substrate and rotatable between first and second positions about a third axis parallel to the first and second axes, the toggle unit including a first cam body defining a first track having a first end at a first distance from the third axis and a second end at a second distance from the third axis that is greater than the first distance and rotating with the toggle unit about the third axis; and
a first pin in the form of an elongate member slidably engaged with the aperture in the mounting plate and extending outwardly from a side of the mounting plate to slidably engage with the first track.

17. The rearview mirror of claim 16, wherein the actuation mechanism further includes a supporting plate coupling the mounting plate with the substrate and positionally fixing the toggle unit with respect to the substrate.

18. The rearview mirror of claim 17, further including a second pin in the form of an elongate member slidably engaging with an aperture defining the third axis and positionally fixing the toggle unit with respect to the substrate.

19. The rearview mirror of claim 17, wherein the supporting plate defines a first rib positioned laterally outside of the mounting plate and the first cam body of the toggle unit with the first cam body positioned between the mounting plate and the rib, the rib further defining a mounting aperture therein slidably receiving the second pin therethrough to positionally fix the toggle unit thereto and a support aperture receiving the first pin therein.

20. A rearview mirror for a vehicle, comprising:
   a substrate having a reflective surface thereon; and
   an actuation mechanism coupled with the substrate, including:
      a mounting plate rotatably coupled with the substrate at a first end thereof along a first axis and having a first pin end positioned outwardly of a first side of the mounting plate and a second pin end positioned outwardly of a second side of the mounting plate, each pin extending along a second axis parallel with the first axis and spaced apart therefrom; and
      a toggle unit positionally fixed with respect to the substrate and rotatable about a third axis between first and second positions, the toggle unit including a first cam body and a second cam body respectively adjacent the first and second sides of the mounting plate and respectively defining a first track and a second track, each having a first end at a first distance from the third axis and a second end at a second distance from the third axis that is greater than the first distance, the first pin end of the mounting plate being slidably engaged with the first track and the second pin end of the mounting plate being slidably engaged with the second track.

* * * * *